(12) United States Patent
Stein et al.

(10) Patent No.: US 10,109,213 B2
(45) Date of Patent: Oct. 23, 2018

(54) EDUCATIONAL E-READER PLATFORM

(71) Applicant: LightSail Education, New York, NY (US)

(72) Inventors: Gideon Stein, New York, NY (US); Steven Gittleson, Great Neck, NY (US); Jessica Reid Sliwerski, Brooklyn, NY (US)

(73) Assignee: LIGHTSAIL EDUCATION, New York, NY (US)

(*) Notice: Subject to any disclaimer, the term of this patent is extended or adjusted under 35 U.S.C. 154(b) by 342 days.

(21) Appl. No.: 14/318,009

(22) Filed: Jun. 27, 2014

(65) Prior Publication Data
US 2015/0050625 A1 Feb. 19, 2015

Related U.S. Application Data

(60) Provisional application No. 61/865,576, filed on Aug. 13, 2013.

(51) Int. Cl.
*G09B 5/14* (2006.01)
*G09B 5/02* (2006.01)

(52) U.S. Cl.
CPC .................. *G09B 5/14* (2013.01); *G09B 5/02* (2013.01)

(58) Field of Classification Search
CPC ........................................ G09B 5/14
USPC ....................................... 434/169
See application file for complete search history.

(56) References Cited

U.S. PATENT DOCUMENTS

| | | | |
|---|---|---|---|
| 8,095,949 B1 * | 1/2012 | Hendricks | H04N 5/4403 345/901 |
| 2006/0121433 A1 * | 6/2006 | Adams | G09B 7/02 434/323 |
| 2007/0067294 A1 * | 3/2007 | Ward | G06F 17/30867 |
| 2007/0292826 A1 * | 12/2007 | Goddy | G09B 19/00 434/156 |
| 2013/0280689 A1 * | 10/2013 | Meer | G09B 7/02 434/350 |
| 2014/0074648 A1 * | 3/2014 | Morton | G06Q 30/0631 705/26.7 |
| 2014/0349272 A1 * | 11/2014 | Kutty | G09B 5/08 434/362 |

OTHER PUBLICATIONS

Wikipedia: Lexile, Web Archive, Web. Nov. 12, 2011. <https://web.archive.org/web/20111112172310/http://en.wikipedia.org/wiki/Lexile#Lexile_Measures_and_The_Common_Core_Standards>.*

* cited by examiner

*Primary Examiner* — Thomas Hong
(74) *Attorney, Agent, or Firm* — Lowenstein Sandler LLP

(57) ABSTRACT

Methods and systems for an educational e-reader platform are provided. The educational e-reader platform may be configured to receive one or more attributes of a student, comprising at least an indication of the student's reading ability, and one or more attributes of digital books available in a library. Using the student and digital book attributes acquired, the educational e-reader platform may create a customized library for the student comprising one or more of the digital books available in the library.

19 Claims, 23 Drawing Sheets

1025

Category menu

1050

Contextual sub-category menu

1125

Standard menu

1150

Sub-standard menu

Loma Vista Elementary

| K | 1 | 2 |
|---|---|---|
| 3 | 4 | 5 |
| 6 | 7 | 8 |

Grade Progress View

Loma Vista Elementary

| KA | KB | 1A | 1B | 1C | 2A |
|----|----|----|----|----|----|
| 2B | 2C | 3A | 3B | 3C | 3D |
| 4A | 4B | 4C | 5A | 5B | 6A |
| 6B | 6C | 7A | 7B | 8A | 8B |

Class Progress View

FIG. 14C

EDUCATIONAL E-READER PLATFORM

CROSS-REFERENCE TO RELATED APPLICATIONS

The present application claims the benefit of U.S. Provisional Patent Application No. 61/865,576, filed Aug. 13, 2013, the disclosure of which is hereby incorporated by reference herein in its entirety.

BACKGROUND

The act of reading is the most effective way for students to build their comprehension skills, yet independent reading has been on the decline for decades in schools. If a student is struggling in their reading, rapid intervention is critical, but students' difficulties are only detected through assessments that can be months, or longer, in coming, and the quality of those interventions is next to impossible for leaders to monitor.

The failure to provide sufficient reading time and appropriate support has resulted in two thirds of American eighth graders scoring below proficient in reading, and few students progress from there. Students who do graduate from high school too often arrive at college reading and writing well below college-ready standards.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which:

FIG. 13 illustrates a Common Core view on the teacher or student e-reader device according to one embodiment.

FIGS. 14A-14D illustrate heat map views on an administrator's e-reader device according to one embodiment.

DETAILED DESCRIPTION

Figure 1:
FIG. 1 illustrates a student dashboard view on a student e-reader device according to one embodiment.

Embodiments described herein may use digital technology to implement an educational e-reader platform for use by students, teachers, administrators or other educators. An e-reader, also referred to as an electronic book reader, e-book reader, or e-book device, is a mobile electronic device that is designed primarily for the purpose of reading digital e-books and other digital content. However, any electronic device that can display text on a screen may act as an e-reader. For example, a tablet device, a mobile phone, a laptop, a netbook, a desktop computer, may all operate as an e-reader for purposes of enabling the embodiments described herein. A device may be configured to execute an e-reader application, such as a mobile app, that allows the device to operate as an e-reader device. An e-book reader device, such as the Kindle® e-book reader device, developed by Amazon.com, Inc., is similar in form to a tablet computer. A tablet computer typically has a screen capable of higher refresh rates, which makes it more suitable for interaction. Tablet computers may also be more versatile, allowing one to consume multiple types of content, as well as create it.

The educational e-reader platform is a digital platform for students and teachers to use and collaborate. The educational e-reader platform may be comprised of processing logic to intelligently determine appropriate content for students based on their reading ability, intelligently restrict access to content that is not appropriate for their reading ability, automatically determine their reading ability using one or more metrics, as well as provide automated mechanisms for tracking their progress and facilitating educator interventions and collaborations.

Embodiments of the educational e-reader platform described herein may be used on any device configured as an e-reader. Embodiments of the educational e-reader platform may provide a high-quality, common core-aligned independent reading and rapid, effective, and accountable educator intervention. More specifically, the educational e-reader platform provides a rich, personalized library tailored for each student, embeds a range of assessments and other tools within each text to monitor a student's growing literacy skills and promote active reading, and wraps the reading experience in a data dashboard and social networking environment allowing students to own their achievement and collaborate with educators to move forward. For educators, embodiments of the educational e-reader platform's psychometrically sound assessments and easy-to-monitor data dashboards may provide rapid, accurate information about the common core-aligned literacy growth of every student, classroom, and school. At the same time, embodiments of the educational e-reader platform may provide scaffolding tools to help teachers provide best practices support and document that support, so that educational leaders can assess and improve their teachers' skills.

The following description provides various use cases of the educational e-reader platform from the perspective of students and teachers, including descriptions of various views that may be presented to students and teachers by the educational e-reader platform. In particular, FIGS. 1-14 provide various views presented by the educational e-reader platform, including views on a student e-reader device and a teacher e-reader device. These views are merely exemplary and illustrate various capabilities of the underlying educational e-reader platform. It should be noted that the functionality described herein may be achieved with various configurations of multiple e-reader devices and the educational e-reader platform in which a collection of one or more servers coordinate operations of the multiple e-reader devices. Some of the functionality is described as being performed by the one or more servers, but some of the functionality could be performed on the e-reader device itself. FIGS. 15-20 illustrate various embodiments of the educational e-reader platform, as well as specific components of the educational e-reader platform.

In one implementation, when a student logs into the educational e-reader platform on an e-reader device (also referred to as a client device), they may be greeted by their personal dashboard (i.e., a main page or homepage), which may present a significant amount of important information in an easy-to-absorb design and various navigation options. On their dashboard, students may review their current reading statistics and goals, communications from their teacher or peers, calendar entries, or click into their personalized library to select a text, such as a book or other digital content, to open. The text accessed directly from the dashboard, for example, may be the text they are currently reading or may be another text presented in their personalized library as described herein.

Upon making a text selection, a student may read the text on the e-reader device. While reading, the educational e-reader platform provides access to reference material as necessary to scaffold the student's reading. For example, at any time, the student may tap or otherwise select one or more words of the text to note a common core-aligned thought (or unaligned, if the student chooses) that may be published to their dashboard, to a teacher, to other students when social features are enabled for peer engagement, to a common core-aligned portfolio or a combination thereof. Similarly, the educational e-reader platform may provide additional features that allow the student to read a definition of a word, hear a pronunciation of the word, or add a thought or note about a word or phrase as described herein.

At logical points in the text, students may encounter sentence completion cloze tests to assess their current understanding. The educational e-reader platform may generate the cloze tests at those logical points in the text. These cloze tests may be statically defined in connection with the digital content or may be dynamically generated based on various inputs, such as the student's previous responses to other tests, the student's current reading level, or the like. At the completion of a text, a student may be asked to write a summary of the text or answer an open-ended question, and may have the option of rating the text for their classmates.

The educational e-reader platform may provide a mechanism for the student to write the summary or to answer the open-ended questions, as well as a rating mechanism to facilitate this activity on the educational e-reader platform.

When the student returns to their personalized library, the student may find an updated selection of engaging informational and literary texts in range (e.g., around and above) of their most recent Lexile measure and related to their reading choices. A Lexile measure is a valuable piece of information about either an individual's reading ability or the difficulty of a text, like a book or magazine article. The Lexile measure may be shown as a number with an "L" after it—880 L is 880 Lexile. A student gets his or her Lexile reader measure from a reading test or program. For example, if a student receives an 880 L on her end-of-grade reading test, she is an 880 Lexile reader. Higher Lexile measures represent a higher level of reading ability. A Lexile reader measure may range from below 200 L for emergent readers to above 1600 L for advanced readers. Readers who score below 0 L receive a BR for Beginning Reader. A book, article or piece of text may get a Lexile text measure when it's analyzed, for example, by MetaMetrics (an educational measurement and research organization). For example, the first "Harry Potter" book measures 880 L, so it's called an 880 Lexile book.

A Lexile text measure is based on the semantic and syntactic elements of a text. Many other factors affect the relationship between a reader and a book, including its content, the age and interests of the reader, and the design of the actual book. The Lexile text measure is a good starting point in the book-selection process, with these other factors then being considered. Lexile text measures are rounded to the nearest 10 L. Text measures reported below 0 L are reported as BR for Beginning Reader. In one embodiment, the educational e-reader platform may determine the student's Lexile measure for individual text being read by the student, as well as track a history of the student's Lexile measure. In a further embodiment, as described in more detail below, the educational e-reader platform may continually adjust the student's personalized library based at least in part on the Lexile measure.

The Lexile measure is one type of metric used to quantize a student's reading level. In other embodiments, other reading metrics may be used and these other reading metrics may be input into the processing logic that creates the customized or personalized library for the individual students. In one embodiment, the educational e-reader platform performs a Bayesian analysis of cloze test results and adjusts the student's libraries based on the Bayesian analysis. As described herein, the educational e-reader platform may include library analytics as well. The library's analytics aim to use a student's growing background knowledge in an area as a jumping-off point to more challenging (in Lexile measure or genre) texts. In this manner, the educational e-reader platform may intelligently determine appropriate content for an individual student based on their reading ability, and intelligently restrict access to content that is not appropriate for their determined reading ability.

FIG. 1 illustrates a student dashboard 100 on a student e-reader device according to one embodiment. The educational e-reader platform can generate and present the student dashboard view on the student e-reader device. The student dashboard may be presented upon log in, providing the student with summaries of their reading activity and progress, and access to various functions made available by the e-reader platform. Content in this view depicts the student dashboard as it might appear for a student already active in the educational e-reader platform. The student dashboard view may include various areas described below. The student dashboard view, as well as other views described below, can be presented on the e-reader devices. These views can be generated as a result of the processing being performed by the educational e-reader platform as described in more detail below with respect to FIGS. 15-20.

A student picture area 102 may display a picture and name of the student, a name of the student's school and the grade the student is currently in. Tapping the picture area, for example, may bring up a modal with instructions for uploading a photo of the student. Badges 103 earned by the student in one or more areas may also be displayed in the student picture area. For example, the following badges may be displayed: (1) reading level (color coded by reading level thresholds); (2) books read milestones (First/5/10/25/50/100); (3) first book completed in a genre (for pilot, this could be first informational or literature book); (4) comprehension ace (if over 85% or above aggregate); and (5) current level in common core mastery (approaching, meeting, exceeding, below, etc.). Additional areas that may be displayed in the student dashboard may include, but are certainly not limited to, a "My Thinking" area 104, a "My Tasks" area 106, a "My Text" area 108, and a "My Progress" area 110.

"My Thinking" area 104 (also referred to as the "Think-Feed") may display notes written by the student in response to books read on the student e-reader device (e.g., in reverse chronological order), along with teacher responses and follow up comments by student and teacher. Thoughts may be organized into threads. A text box in each thread can be used to allow the student to enter a follow-up thought. Highlighted text around which the student wrote the thought may also be shared, providing the student (and teacher) with context. Swiping the thought feed vertically, for example, can be configured to bring older thought threads into view. Prior to the student generating thoughts, this area could display a greeting from the teacher, an introduction to the concept of "reading thoughts," an example thought or any combination thereof.

"My Tasks" area 106 may display items pulled from the student's calendar and one or more goals generated in the student's most recent conference. Teachers can check in with students both through their comments on student thinking section and through individual or small group conferencing sessions. The educational e-reader platform can be configured to prompt teachers to meet individually with students regularly, as well as to seek out students when their reading behavior causes an alert. The educational e-reader platform can also provide a mechanism to teachers to allow the teacher to create small group meetings based on analytics that identify shared issues or interests of students performed by the educational e-reader platform. In one embodiment, the educational e-reader platform can ensure a personalized conference for a student, and can embed their data in a conferencing template. The educational e-reader platform can use the conferencing template to prompt teachers to use a format that gets students thinking about their own habits and planning for growth. The literacy goals that students create with their teachers during conferences can be recorded on the teacher's conferencing template. In a further embodiment, the educational e-reader platform can populate a "My Goals" section in the "My Tasks" area based on the information input into the conferencing template by the teacher.

"My Text" area 108 may display a book the student is currently reading or books recommended for the student. Tapping a book in the "My Text" area opens the book in a reader view. Prior to the student selecting books to read, this area could display a call to action for the student to choose a book and start reading.

"My Progress" area 110 may display highlights from the student's progress page. For example, students may see the number and type of texts read, the number of common core thinking, and their Lexile progress against the benchmark thresholds set by the school (or default CCSS Lexile benchmarks). Tapping elsewhere in the My Progress area can be configured to open the progress page.

A global navigation area 112 may also be displayed on the student dashboard. The global navigation area may include, but is certainly not limited to, a class list option 112a, a common core option 112b, a calendar option 112c, a library option 112d, a progress option 112e and a settings option 112f. Selecting options 112a, 112b, 112c, 112d or 112e may open respective views (to be discussed further below). Some of the options may also be disabled until enabled by the student's teacher. Selecting option 112f may present choices for adjusting settings, contact information and log-in/log-out credentials.

Figure 2:
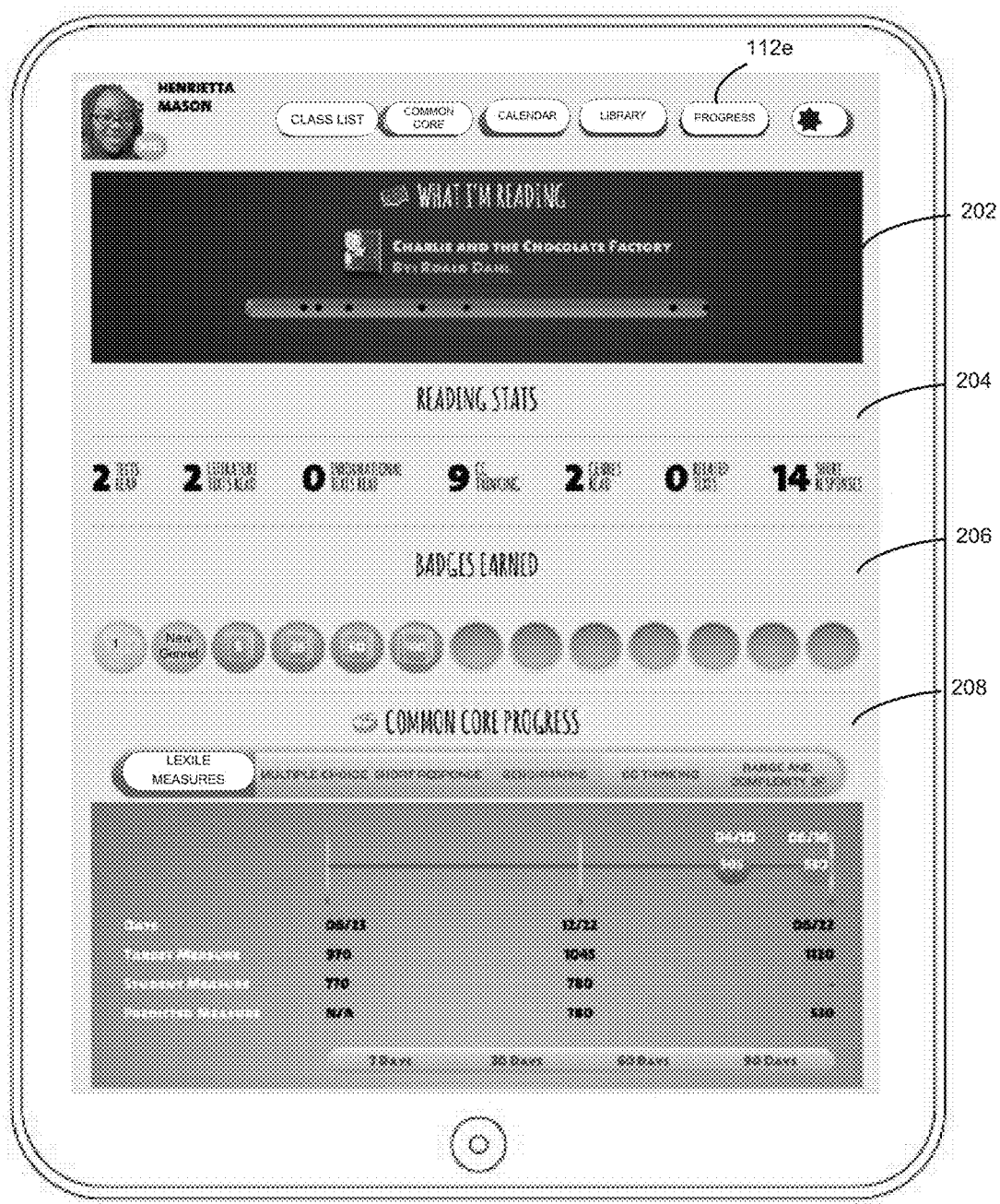
FIG. 2 illustrates a student progress view on the student e-reader device according to one embodiment.

FIG. 2 illustrates a student progress view 200 on the student e-reader device according to one embodiment. The educational e-reader platform can generate and present the student progress view on the student e-reader device when, for example, progress option 112e is selected from navigation area 112 on the student dashboard. The student progress view may be configured to show the student's micro- and macro-progress ranging from what the student is currently reading to the student's common core mastery. Areas that may be displayed in the student progress view may include, but are certainly not limited to, a "What I'm Reading" area 202, a "Reading Stats" area 204, a "Badges Earned" area 206, and a "Common Core Progress" area 208.

"What I'm Reading" area 202 may display the student's accomplishments in the current book being read and a progress bar may be provided to show the student's reading progress within the book. Swiping horizontally in this area of the student progress view may also show previous books read by the student.

"Reading Stats" area 204 may display statistics on the student's accomplishments in key areas. For example, statistics may be displayed relating to the number of different types of texts read, common core related thinking and short responses by the student. The displayed statistics on the student's accomplishments may be color coded to indicate progress levels, which may be set by an educator (e.g., the student's teacher) or predefined by the educational e-reader platform based on one or more criteria associated with the student.

"Badges Earned" area 206 may display badges awarded to the student for specific actions and accomplishments over time, as well as badges waiting to be earned to set tangible progress goals. Each badge can be configured to reveal an explanatory caption when the student selects the badge on the e-reader device. Badges may be awarded for such things as: (1) On your way (one book read); (2) 5/10/20/50/100 books read; (3) First book in new Genre (one per Genre); (4) 5/10/20 literature books read; (5) 5/10/20 informational books read; (6) 5/10/25/50 thoughts written on each common core standard (e.g., craft and structure, key ideas and details, integrating knowledge); (7) Scholar of the Week (most thoughts); (8) Thought of the Week (teacher award) or the like.

"Common Core Progress" area 208 may display a student-controllable data display. The student can select one of a plurality of common core progress categories to see a heat map or other type of graph of their progress to date in a selected category. For example, the students may see their Lexile progress against the benchmark thresholds set by the school (or default CCSS Lexile benchmarks), predicted literacy achievement against expected literacy achievement or any other applicable measurement. Touching and holding a progress category or data element on the display screen of the e-reader device may allow more detailed information regarding the category to be revealed (e.g., a definition or a drill down). Touching a point in the graph on the display screen of the e-reader device may reveal data specific to the point selected (e.g., data specific to a particular date). Tapping an information icon (not shown) may display a page explaining the common core standards.

Figure 3:
FIG. 3 illustrates a customized library view on the student e-reader device according to one embodiment.

FIG. 3 illustrates a customized library view 300 on the student e-reader device according to one embodiment. The educational e-reader platform can generate and present the customized library view on the student e-reader device when, for example, library option 112d is selected from navigation area 112 on the student dashboard. Areas that may be displayed in the customized library view may include, but are certainly not limited to, a "What I'm Reading" area 302, a "Recommended" area 304, and an "All Books" area 306.

"What I'm Reading" area 302, similar to area 202 of FIG. 2, may display the current book being read by the student and a progress bar to show the student's reading progress within the book.

"Recommended" area 304 may display one or more books recommended for the student. As described herein, the educational e-reader platform can provide recommendations using one or more algorithms based on various inputs, such as the Lexile measure of a student, genre, social commonalities, or the like.

"All Books" area 306 may display books in a single reading band. The student's current band may be shown by default. The student may also display other bands by selecting one of a plurality of bands 306a. Within a given band, all book types are displayed by default. The student may display all books in a band or only literature or informational books by selecting one of a plurality of book types 306b. Books completed by the student may be displayed. Ratings given to books by the student, and possibly by all students in an aggregate, may be displayed. Additional interactive features can also be integrated, for example, to identify a completed book not yet rated by the student and display a corresponding call to action to rate the book. A search field 306c may also be provided to search digital content in the library. Search field 306c can be auto filled with names of books in the library as the student types search terms into the field. Search results replace books in a selected band, showing all books with the search terms appearing in the title, author or subject. The customized library view may be configured so that when the student selects a band label, the normal display of all books in the selected band is restored.

Figure 4:
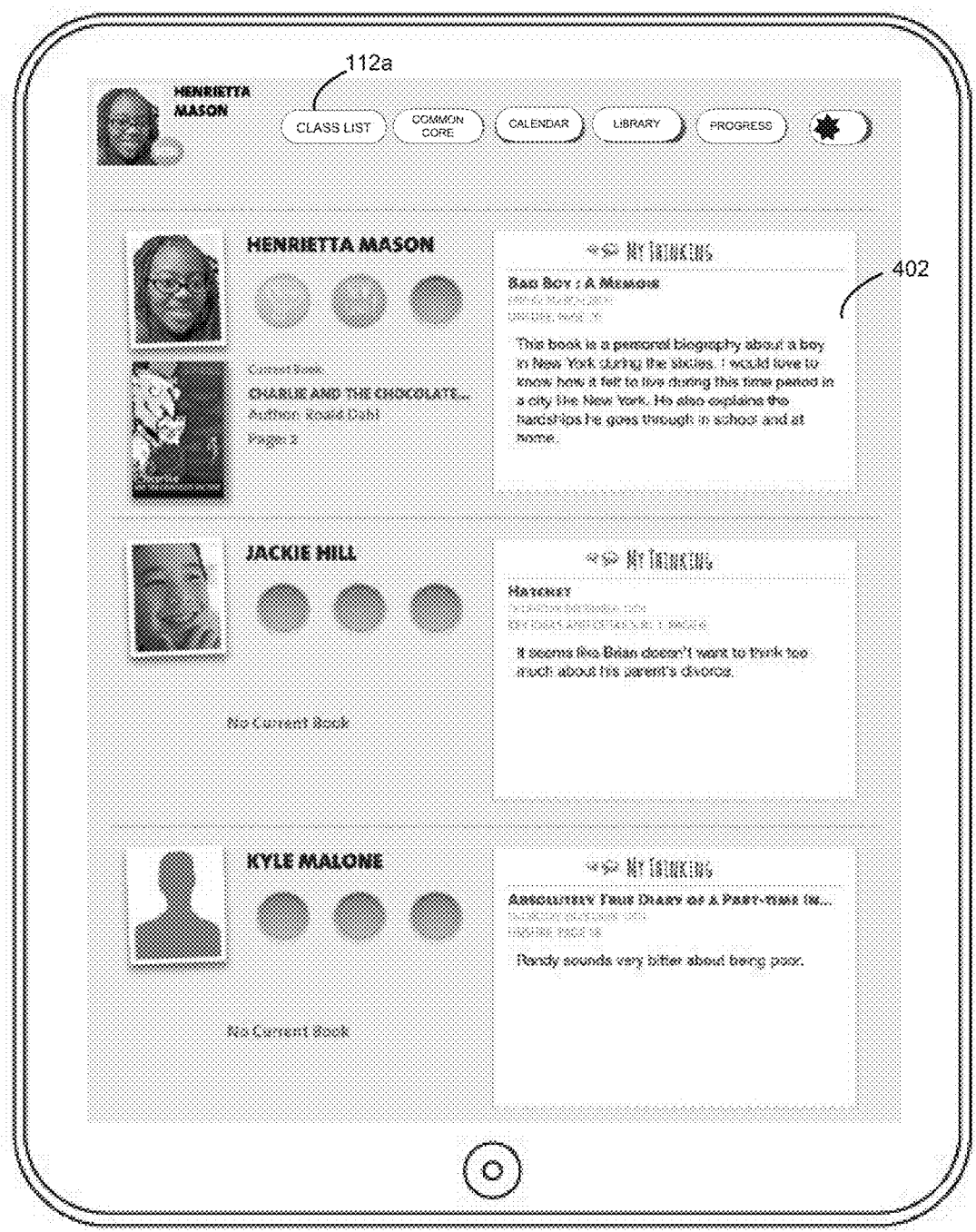
FIG. 4 illustrates a class activity feed view on the student e-reader device according to one embodiment.

FIG. 4 illustrates a class activity feed view 400 on the student e-reader device according to one embodiment. The educational e-reader platform can generate and present the class activity feed on the student e-reader device when, for example, class list option 112a is selected from navigation area 112 on the student dashboard. The teacher can, at her discretion, enable the class list option 112a for an entire class or for individual students. When enabled, selecting class list option 112a may display a listing of all students in a class, which may be scrollable via a vertical swipe on the display screen of the e-reader device. Each student listing may be comprised of badges earned by the student, and the student's current book and place in the book. A "My Thinking" box 402 may display each student's most recent thinking thread, including all entries and teacher responses in that thread. The teacher's recent thinking for a book he or she is currently reading may also be displayed in the class activity feed view.

Figure 5:
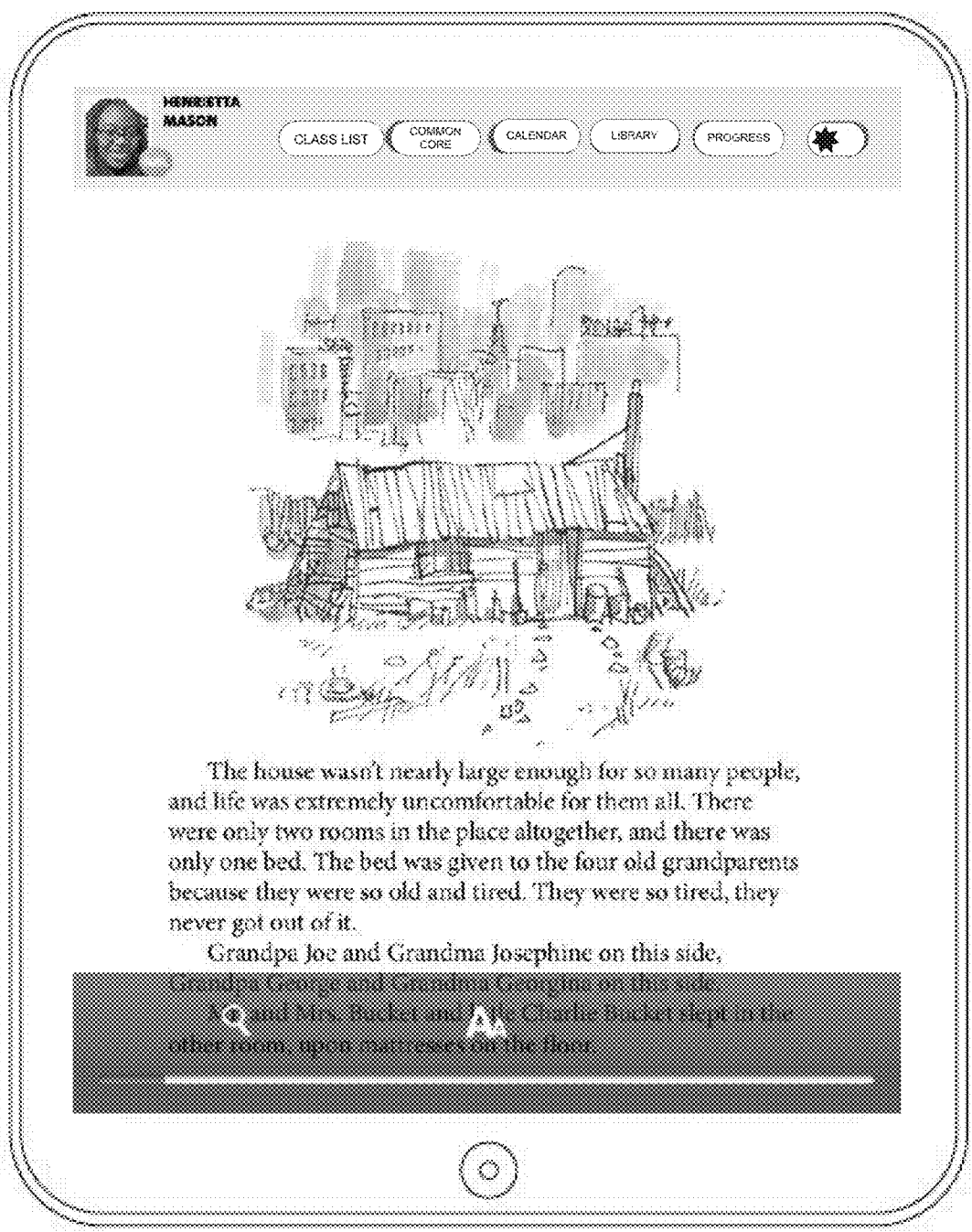
FIG. 5 illustrates a controls view on the student e-reader device according to one embodiment.

FIG. 5 illustrates a controls view 500 on the student e-reader device according to one embodiment. The educational e-reader platform may generate and present the controls view on the student e-reader device when, for example, the student taps on a designated area in the screen illustrating a page of the book being read. The control view may provide a progress bar and a search function for searching content within the book. The progress bar may be configured to provide a visual indication of the reader's current location in the book. The current page and total pages may also be provided below, for example, the progress bar.

Figure 6:
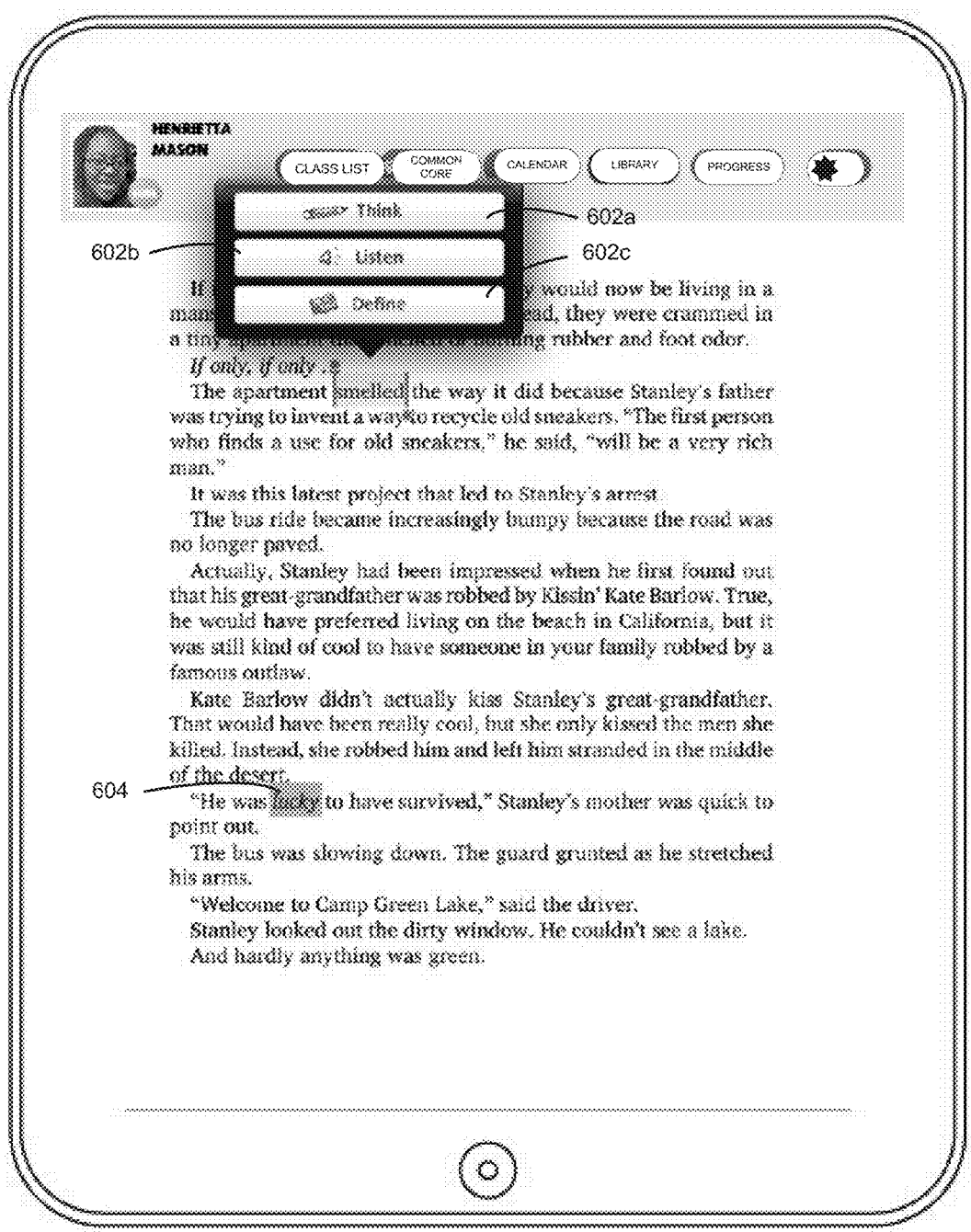
FIG. 6 illustrates an actions menu and flagged text in connection with a page of a book displayed on the student e-reader device according to one embodiment.

FIG. 6 illustrates a view 600 comprising an actions menu 602 and flagged word (or passage) 604 in connection with a page of a book displayed on the student e-reader device according to one embodiment. Referring to FIG. 6, the educational e-reader platform can generate and present actions menu 602 on the student e-reader device when, for example, the student selects text on a page of a book currently being read. The student may select text by highlighting the text using standard text highlighting gestures (e.g., tapping and holding on a word) on the display screen of the e-reader device. In one embodiment, upon highlighting text, the educational e-reader platform may present actions menu 602 with one or more options that can be taken relating to the highlighted text. Options presented on actions menu 602 may include, but are certainly not limited to, a "Think" option 602a, a "Listen" option 602b and a "Define" option 602c. When the student taps "Think" option 602a in menu 602, a text modal for entering thoughts may be presented. When the student taps "Listen" option 602b in menu 602, an audio playback of highlighted word may be presented. When the student taps "Define" option 602c in menu 602, a text modal defining the word may be presented. Option 602c may be disabled and grayed out if more than one word is highlighted. Tapping elsewhere on the page can be configured to close the menu.

Figure 7A:
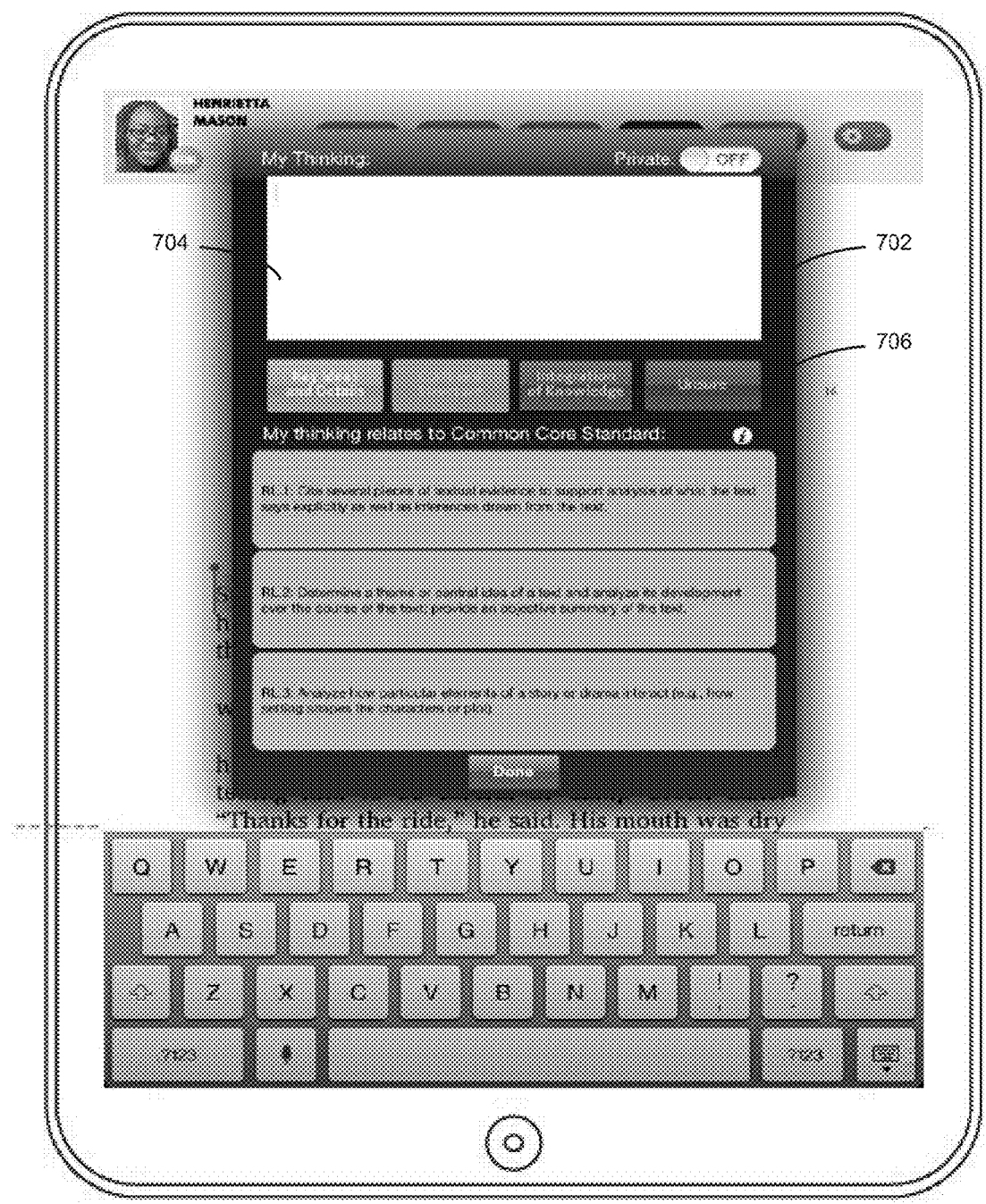
FIGS. 7A and 7B illustrate, respectively, a text entry modal and an insight correspondence on the student e-reader device according to one embodiment.
Figure 7B:

FIGS. 7A and 7B illustrate, respectively, a view 700 of a text entry modal and a view 750 of an insight correspondence that may be presented on the student e-reader device according to one embodiment. Referring to FIG. 7A, a text entry modal 702 may be presented, allowing the student to enter thoughts relating to text he or she has highlighted in a book currently being read. The educational e-reader platform can generate and present text entry modal 702 on the student e-reader device when, for example, the student selects option 602a in menu 602, as illustrated in FIG. 6. When the student taps in a text box field 704 provided in modal 702, an on-screen keyboard may appear. On appearance, modal 702 may include choices 706 to associate the student's entry to a Common Core category (Key Ideas and Details, Draft and Structure, and Integration of Knowledge) and to one of a plurality of specific standards within that Common Core category. Specific standards are contextual, depending on the type of book (informational or literature) and the Common Core category selected. Thoughts entered by the student for highlighted text may remain highlighted in the book.

Referring to FIG. 7B, an insight correspondence 752 may be presented, allowing a student and a teacher to exchange thoughts on a word or a passage flagged on a page in a book currently being read by the student. The educational e-reader platform can generate and present insight correspondence 752 on the student e-reader device when, for example, the student selects flagged word 604, as illustrated in FIG. 6. Tapping a flagged word or passage may bring up a modal displaying a thought thread 754, and if the last entry in the thread was by a teacher, a text entry box 756 may be displayed at the end of the thread to allow the student to enter additional remarks in response to the teacher's entry.

The above description is directed to various views that can be presented by the educational e-reader platform on the student e-reader devices. The following description is directed to various views that can be presented by the educational e-reader platform on the teacher e-reader devices.

Figure 8:
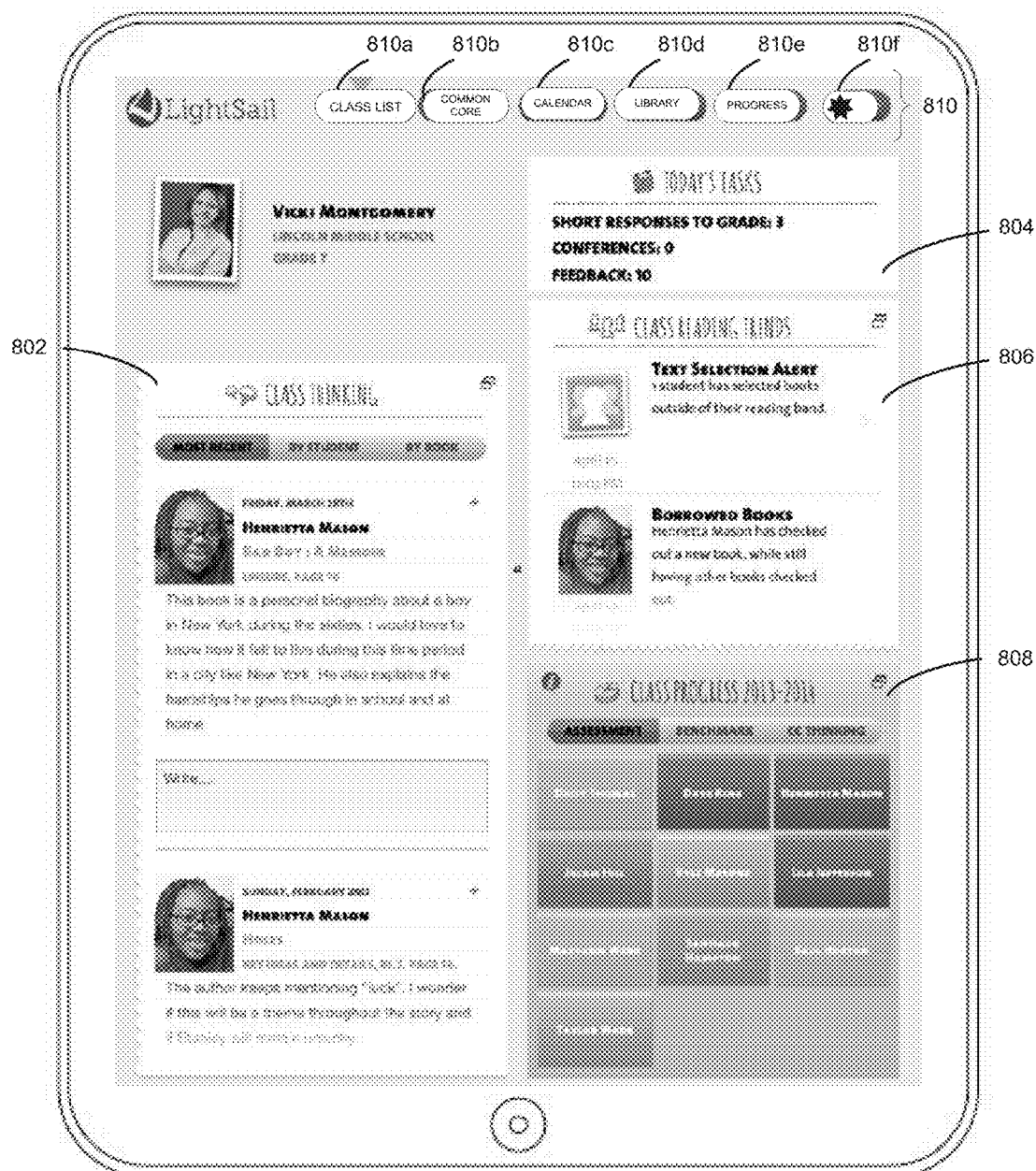
FIG. 8 illustrates a teacher dashboard view on a teacher e-reader device according to one embodiment.

FIG. 8 illustrates a teacher dashboard 800 on a teacher e-reader device according to one embodiment. The educational e-reader platform can generate and present the teacher dashboard view on the teacher e-reader device upon log in, providing the teacher with summaries of student-related activity and progress, and access to various functions made available by the e-reader platform. The teacher dashboard can be configured to mirror the layout of the student dashboard in FIG. 1. Areas that may be displayed in the teacher's dashboard may include, but are certainly not limited to, a "Class Thinking" area 802, a "Today's Tasks" area 804, a "Class Reading Trends" area 806, and a "Class Progress" area 808.

"Class Thinking" area 802 (also referred to as the "Think-Feed") may display all of the students' "thinking" (written thoughts) in a class. The students' written thoughts can be organized, for example, in a reverse chronological order by the most recent entry, by the student or by book. Teachers may comment on students' written thoughts directly in the ThinkFeed.

"Today's Tasks" area 804 may display how many short-response questions the teacher currently has to grade, number of upcoming conferencing sessions and number of students who still require teacher feedback. By selecting short responses to grade, the teacher may be directed to a scaffolded grading form. There, each student answer may be presented without the student's name, to avoid bias, along with the original question and examples of answers that are below, approaching, on, or above grade-level standards, along with rationales for those designations. Teachers choose one of a plurality of designations for the answer and can add comments. By selecting conferences, the teacher may be directed to a conference template pre-populated with students' most recent reading data and goals, and linked to past conferences. The teacher can link notes entered in the conference template to a particular common core standard, and can also decide which notes appear in a student's view of the conference template. The teacher's notes can be published in the student's view of the conference template, as well as in a goals section of "My Tasks" area 106 on the student's e-reader device.

"Class Reading Trends" area 806 may display class reading trends generated by the educational e-reader platform based on each student's reading behaviors. Each student in the class may be listed, along with the book each is reading and their current reading rate. When the area is expanded, more students may be displayed along with a scroll bar. Swiping vertically, for example, within the expanded area can bring more students into view. Class reading trends may be presented in such a way to ensure that teachers know when students are struggling. If an alert is presented, selecting the alert can bring up a performance alert screen that provides granular detail.

"Class Progress" area 808 may display a class progress heat map. The class progress heat map may provide a quick view of class performance by assessment, benchmark, or common core thinking. Students' names may appear as color-coded fields in the class progress heat map. The color-coded fields may correspond to the students' progress towards common core mastery. For example, different colors may be assigned for progress deemed to be below, approaching, meeting or exceeding common core standards. When a student's name is selected in class progress heat map, a more detailed progress view may be presented for that student.

A global navigation area 810 may also be displayed on the teacher dashboard. Similar to the student dashboard of FIG. 1, the global navigation area on the teacher dashboard may include, but is certainly not limited to, a class list option 810a, a common core option 810b, a calendar option 810c, a library option 810d, a progress option 810e and a settings option 810f. Selecting options 810a, 810b, 810c, 810d or 810e may open respective views.

Figure 9:
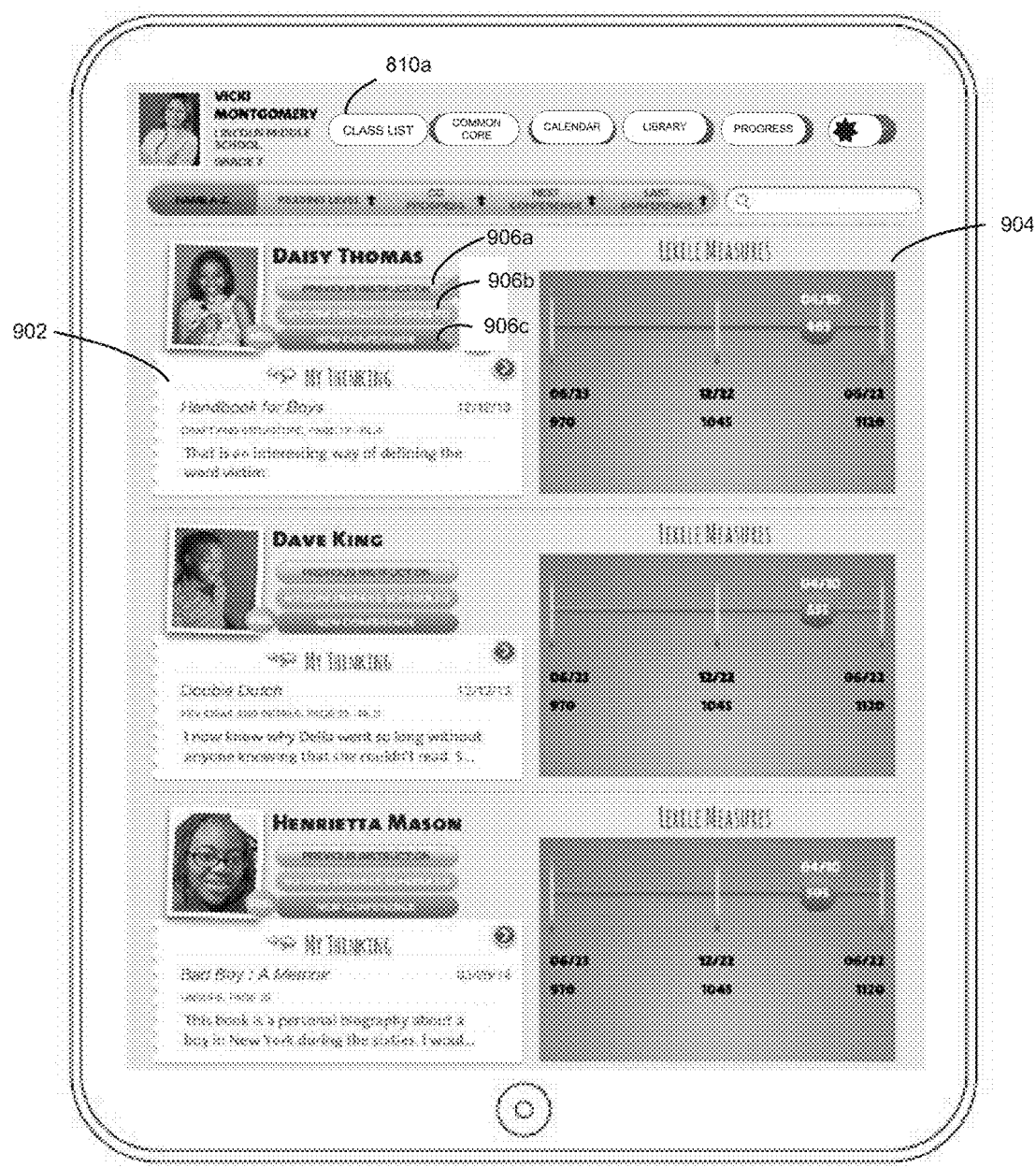
FIG. 9 illustrates a class list view on the teacher e-reader device according to one embodiment.

FIG. 9 illustrates a class list view 900 on the teacher e-reader device according to one embodiment. The educational e-reader platform can generate and present the class list view on the teacher e-reader device when, for example, the class list option 810a is selected from navigation area 810 on the teacher dashboard. The class list provides the teacher with an overview of the status of all her students, each presented with their most recent thought 902 and a graph of their current and predictive Lexile measures 904, as well as links to previous conferences and related instructional notes 906a, upcoming conferences 906b, and scheduling a new conference 906c. The list may be scrollable and display students alphabetically by last name, by reading level, by common core progress, or by next and last conference.

Figure 10A:
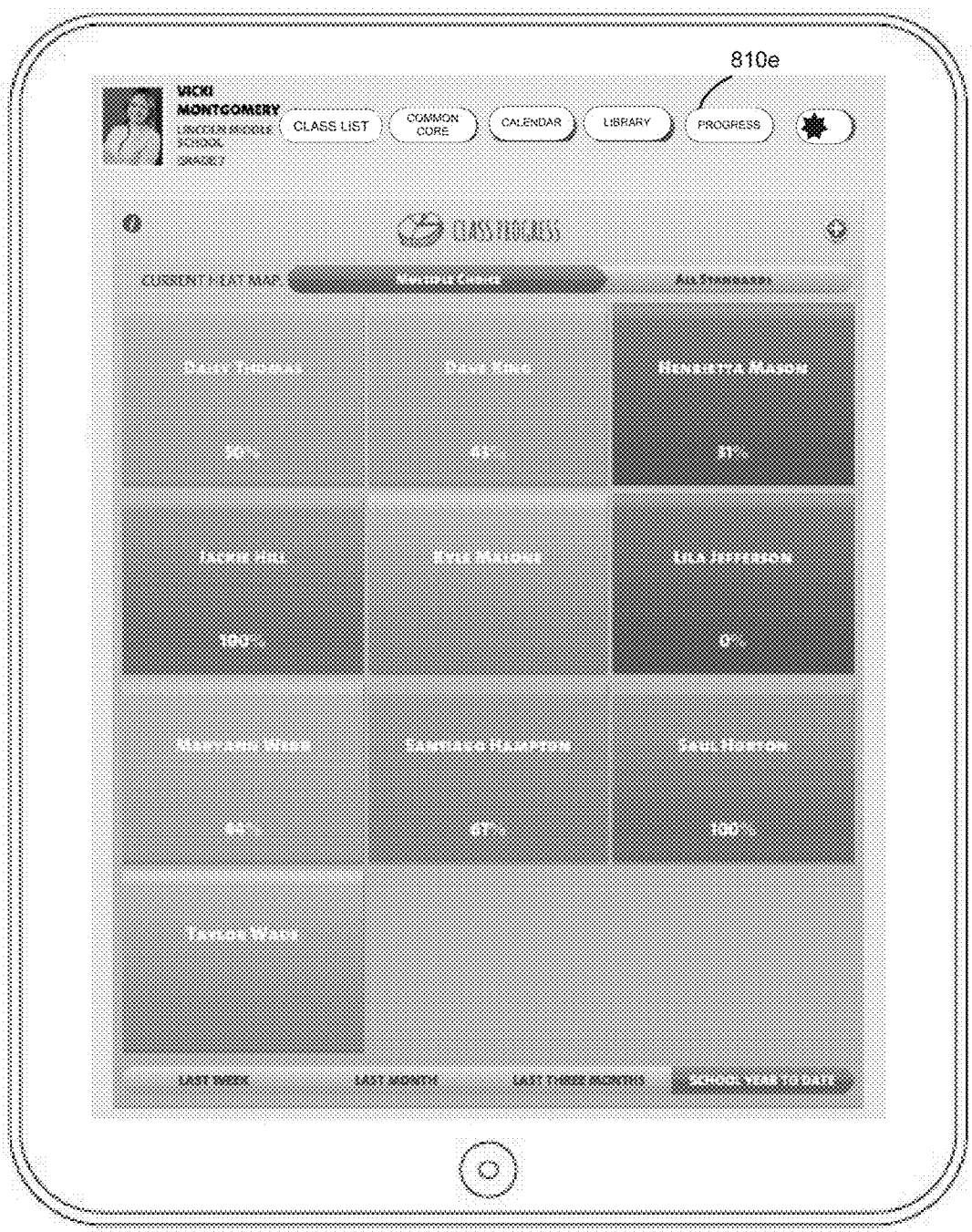
FIG. 10A illustrates a class progress heat map view and FIGS. 10B and 10C illustrate, respectively, a category menu and a contextual sub-category menu for the class progress heat map view on the teacher e-reader device according to one embodiment.
Figure 10B:
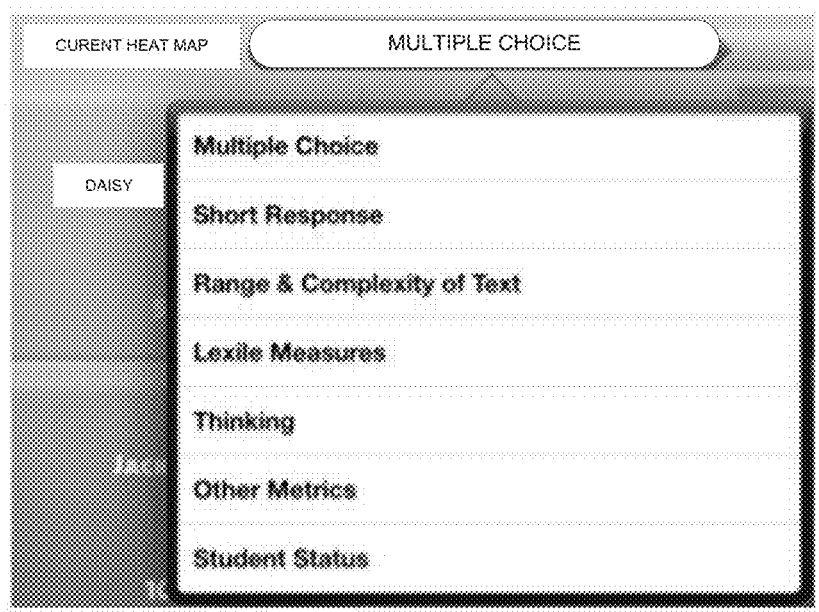
Figure 10C:
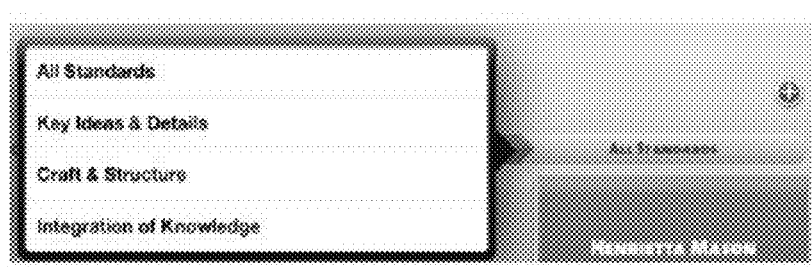

FIG. 10A illustrates a class progress heat map view 1000 and FIGS. 10B and 10C illustrate, respectively, category menu 1025 and contextual sub-category menu 1050 on the teacher e-reader device according to one embodiment. The educational e-reader platform can generate and present the class progress heat map view on the teacher e-reader device when, for example, the progress option 810e is selected from navigation area 810 on the teacher dashboard. The class progress heat map may present consolidated data for the past week, month, last few months, or an entire school year to date. Teachers may select a specific category they wish to view in the heat map from category menu 1025, which provides a list of options that may include, but are not limited to, multiple choice, short response, range and complexity of text, Lexile measures, thinking, student status or any other metric. Teachers may further select a corresponding standard from contextual sub-category menu 1050, which provides a list of options that may include, but are not limited to, all standards, key ideas and details, craft and structure, integration of knowledge or any other metric. Other applicable metrics may be, for example, complexity of text, comprehension scores, average reading speed, current reading level or words looked up.

Figure 11A:
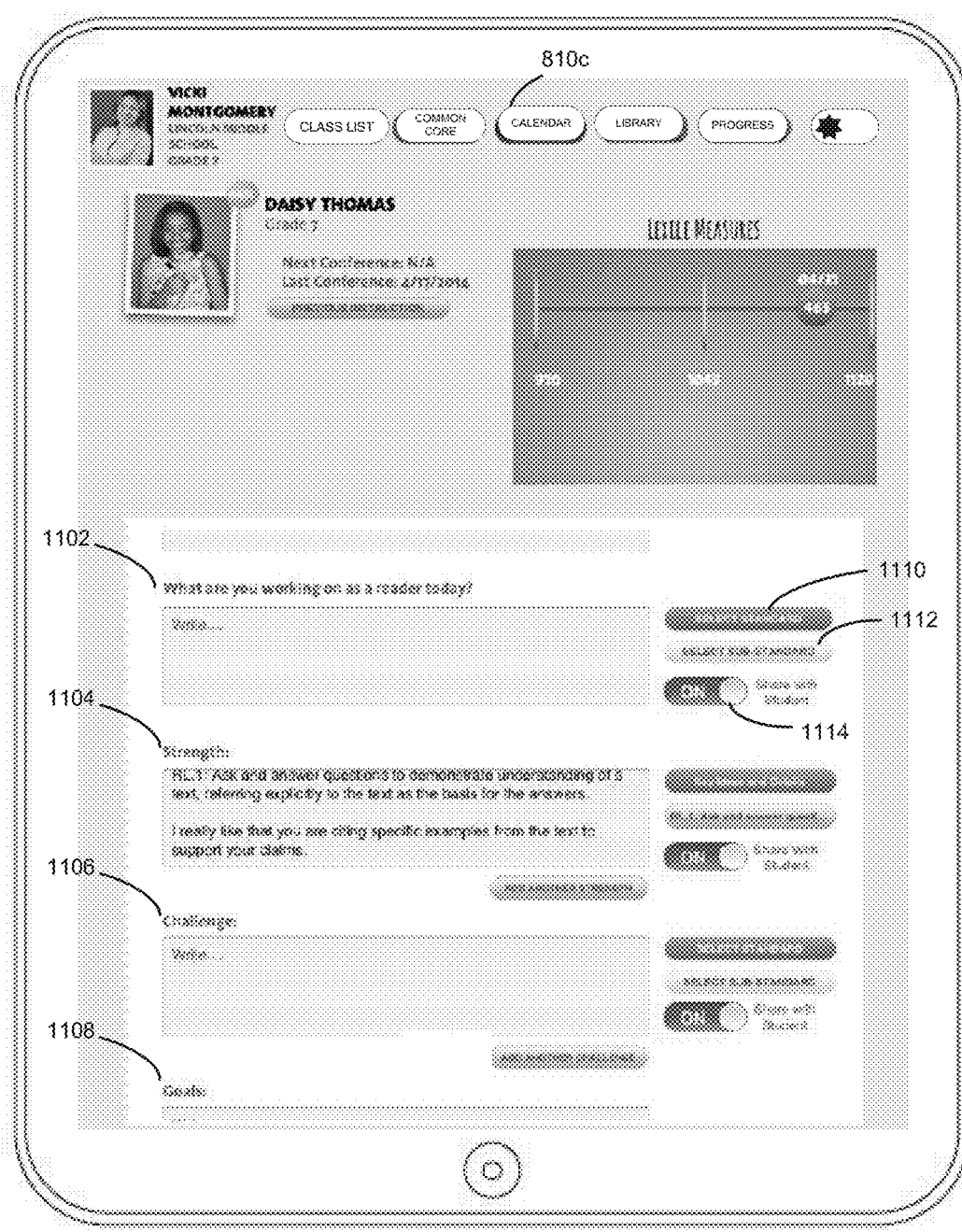
FIG. 11A illustrates a conference template view and FIGS. 11B and 11C illustrate, respectively, a standard menu and a sub-standard menu for the conference template view on the teacher e-reader device according to one embodiment.
Figure 11B:
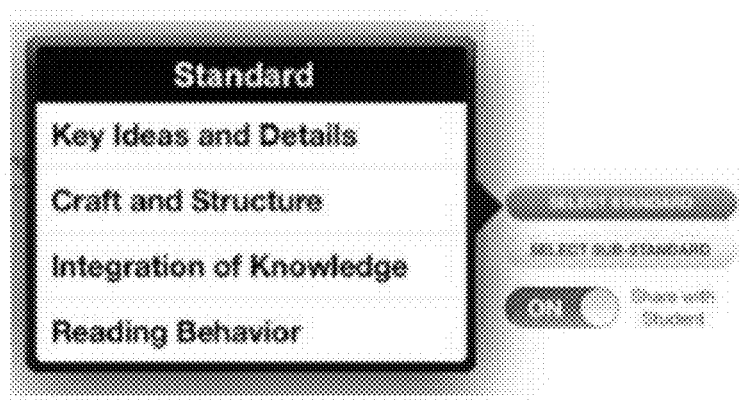
Figure 11C:
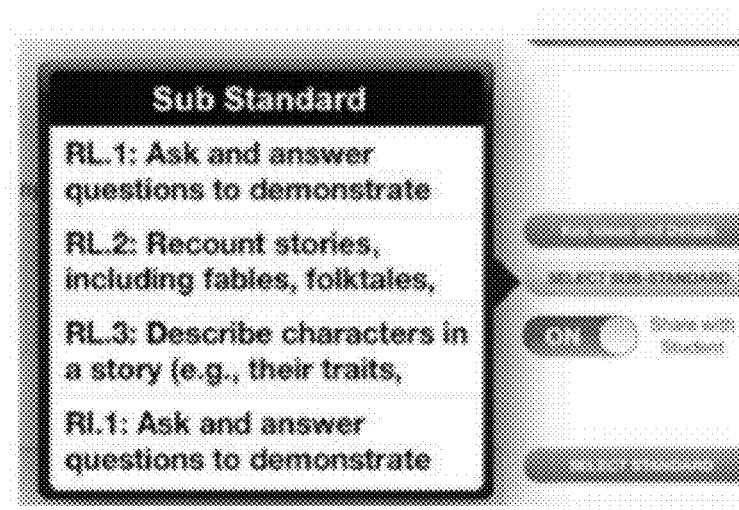

FIG. 11A illustrates a conference template view 1100 and FIGS. 11B and 11C illustrate, respectively, a standard menu 1125 and sub-standard menu 1150 on the teacher e-reader device according to one embodiment. The educational e-reader platform can generate and present the conference template view on the teacher e-reader device when, for example, the calendar option 810c is selected from navigation area 810 on the teacher dashboard. Selecting calendar option 810c may further display customizable views of scheduled conferences, completed conferences, assessments, and student reading times. Teachers may also access students' individual calendars from their calendar.

The conference template view may include multiple text entry fields, such as: (i) a "What are you working on?" field 1102; a "Strength" field 1104; a "Challenge" field 1106; and a "Goal" field 1108. Additional entry fields may be incorporated into the conference template view. Teachers may select a standard 1110 for a given entry from menu 1125, which provides a list of options that may include, but are not limited to, key ideas and details, craft and structure, integration of knowledge or reading behavior. When a standard is selected, teachers may further select a corresponding sub-standard 1112 from menu 1150, which provides a list of options that relate to the selected standard. The conference template view may further provide options enabling the teacher to enter multiple strengths and challenges. The teacher can choose which of the entries provided in fields 1102-1106 to share or not share, for example, via a toggle 1114 provided on the conference template view.

Figure 12:
FIG. 12 illustrates a think-feed expanded view on the teacher e-reader device according to one embodiment.

FIG. 12 illustrates a ThinkFeed expanded view 1200 on the teacher e-reader device according to one embodiment. The educational e-reader platform can generate and present the expanded view on the teacher e-reader device when, for example, a window expansion function [+] is selected for one of the student threads shown in "Class Thinking" area 802 on the teacher dashboard. When selected, the expanded view may display all threads from that student and may be sorted in a chronological order (e.g., with the thread with the most recent entry appearing first) or display only those threads awaiting a response by the teacher. Filtering functions 1202 may be provided in the expanded view to allow the teacher to display thinking entered by one student, thinking from all students related to just one book or the teacher's thoughts relating to a student.

FIG. 13 illustrates a Common Core view 1300 on the teacher or student e-reader device according to one embodiment. The educational e-reader platform can generate and present view 1300 on the teacher e-reader device when, for example, common core option 810b is selected from navigation area 810 on the teacher dashboard, common core option 112b is selected from navigation area 112 on the student dashboard, or an information icon accompanying common core data in several locations of the content presented to the student or teacher on their respective e-reader devices is selected. In this view, Common Core standards for a particular grade level 1302 may be displayed along with a particular student's exposure level 1304 (e.g., number of times practiced) to each of the standards. Further information may be provided by selecting one of the exposure levels displayed in view 1300. For example, an interaction window 1306 may be displayed showing correspondence between the student and teacher on a particular Common Core standard. Common Core standards displayed in view 1300 may be configured to state-specific standards, but may also be configured to school-specific pedagogical foci.

FIGS. 14A-14D illustrate, respectively, heat map views 1400, 1425, 1450 and 1475 on an administrator's e-reader device according to one embodiment. The educational e-reader platform can generate and present the heat map view when, for example, a progress option 1402 is selected on a dashboard presented on the administrator's e-reader device. Heat map views may be provided to display common core progress levels for all schools, all the grades in one school, all the classes in one grade, all the students in one class (similar to class progress heat map view 1000 of FIG. 10A), or a particular student.

Figure 14A:
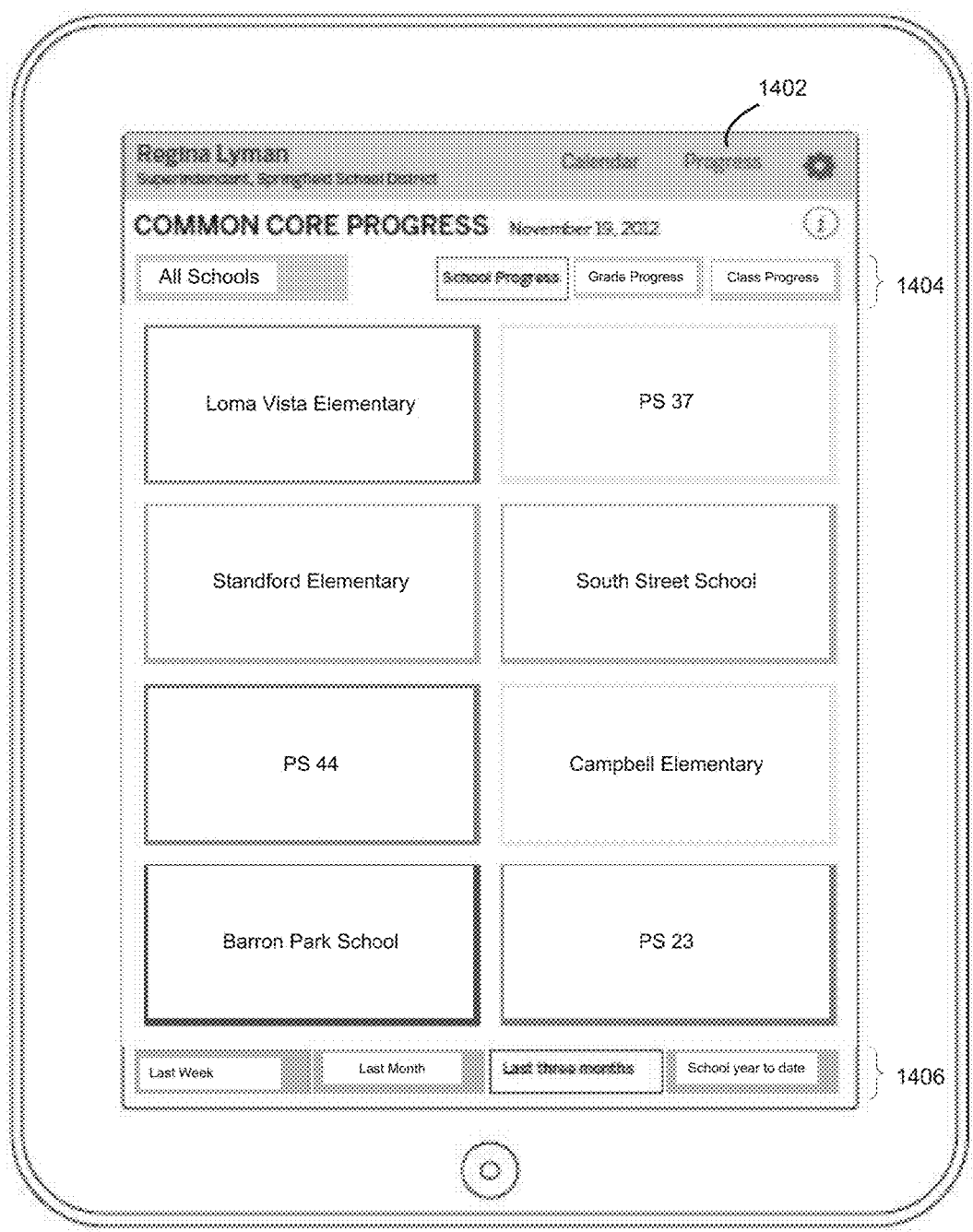

When viewing a heat map, data element granularity ranging from school to grade to class to individual student is provided. Every data element in a heat map may be selectable, wherein a new page showing another heat map of the selected element may be presented. Referring to FIG. 14A, heat maps for all schools may be presented, where the overall progress in each school is made available to the administrator. Similarly, referring to FIG. 14B and FIG. 14C, heat map views for grade progress or class progress at a particular school may be presented as another level of granularity for viewing the data element desired. For example, as illustrated in FIG. 14B and FIG. 14C, the grade progress view shows the grades K-8 for the Loma Vista school and the class progress view shows the individual classes at the Loma Vista school, respectively. Changing between heat map views for school progress, grade progress or class progress may be enabled, for example, by options 1404. Progress for different time frames may also be provided on the heat map view by selecting, for example, one of the available time frame options 1406.

Figure 14D:
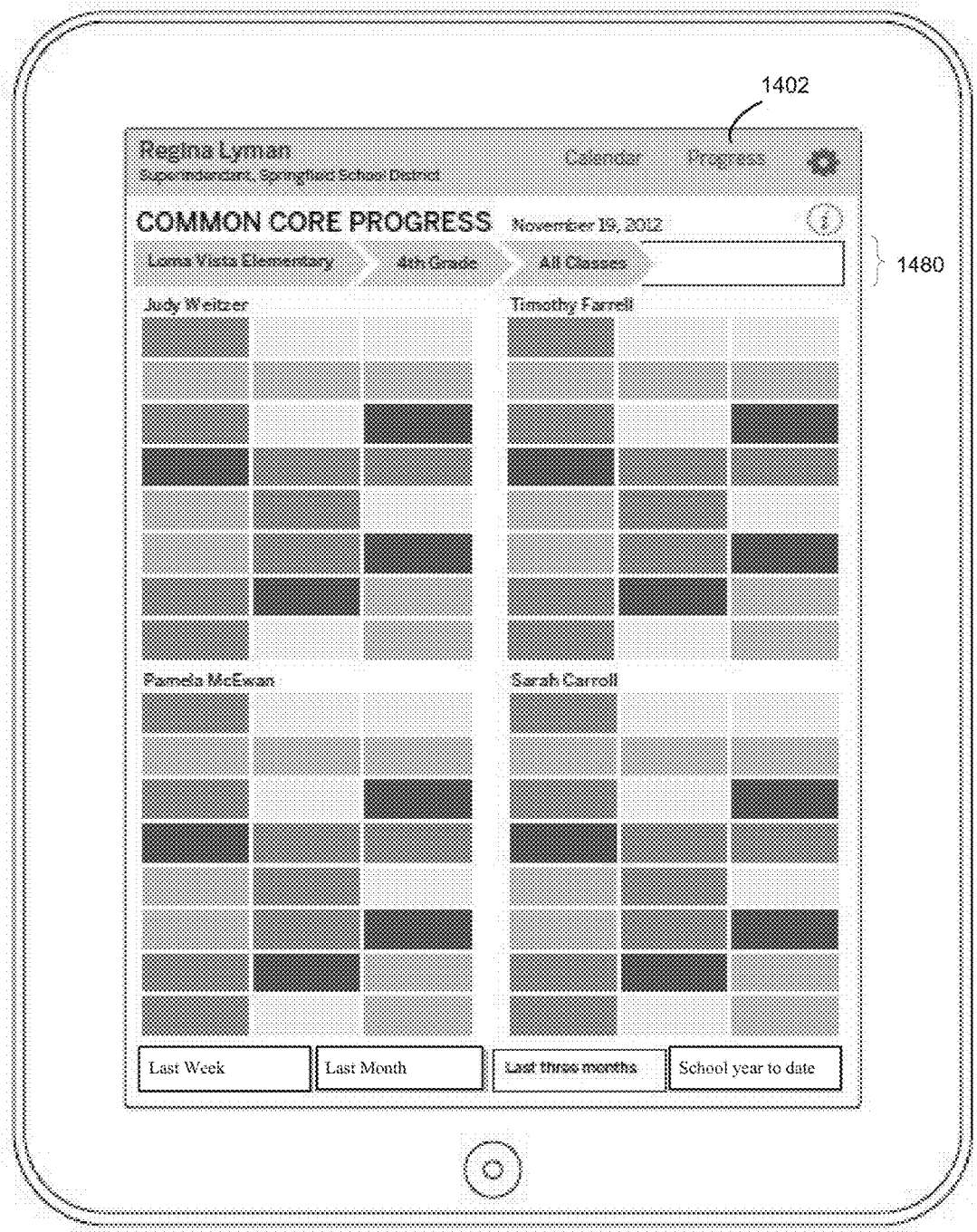

Referring to FIG. 14D, accessing different heat map views may be made via a sequence of menus 1480 permitting the administrator to select from a listing of schools, grades, classes and students. For example, in the heat map view illustrated in FIG. 14D, the Loma Vista school is selected from a schools menu, the 4th grade is selected from a grades menu, and all classes is selected from a classes menu. These selections provide a heat map view for all the $4^{th}$ grade classes at the Loma Vista school, which may be sorted by the teacher's name. If a specific class is selected from the classes menu, a menu for selecting individual students may also be presented.

Figure 15:
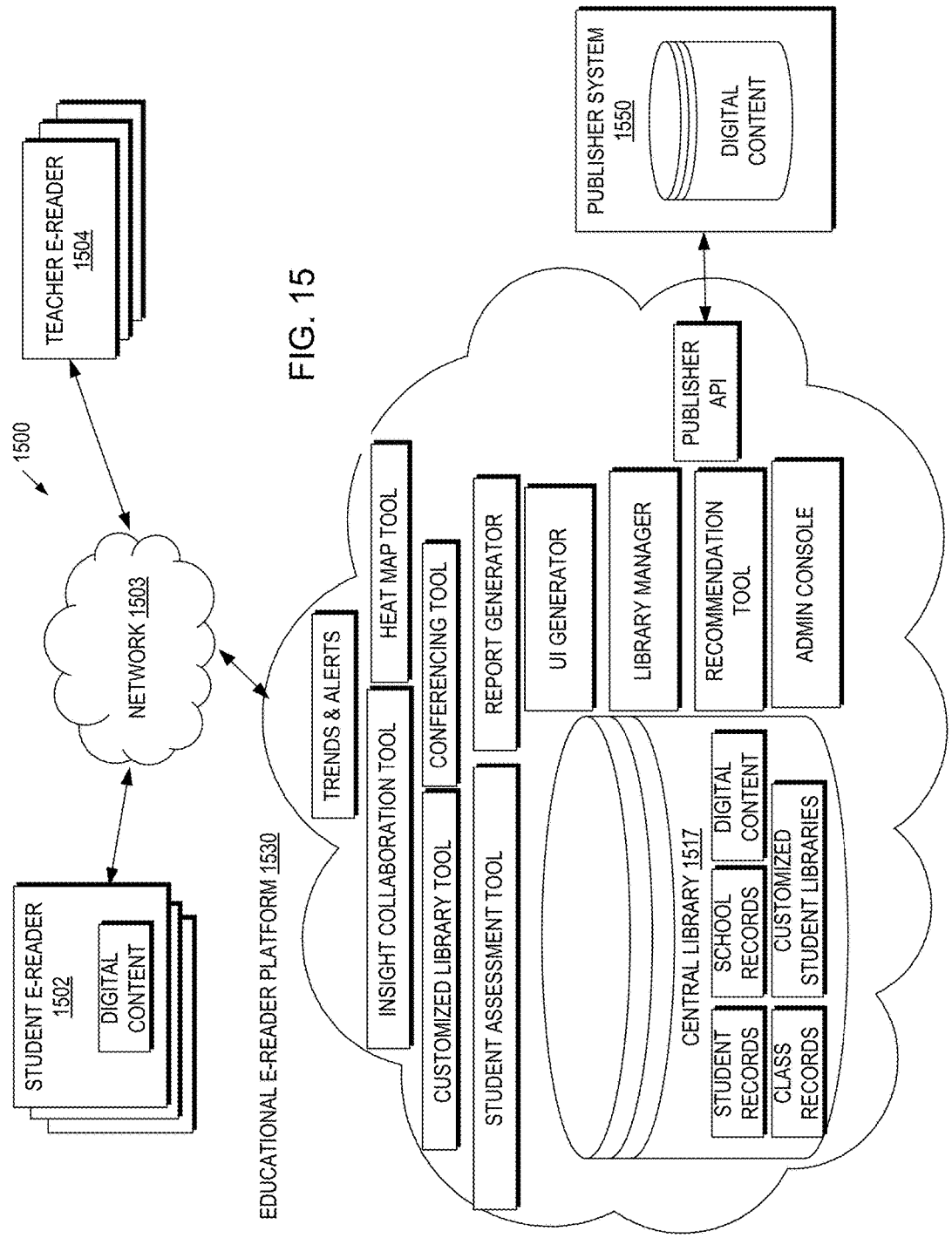
FIG. 15 is a block diagram of an exemplary network architecture in which embodiments of an education e-reader platform may operate.

FIG. 15 is a block diagram of an exemplary network architecture 1500 in which embodiments of an education e-reader platform may operate. The network architecture 1500 may include educational e-reader platform 1530, one or more student e-reader devices 1502, and one or more teacher e-reader devices 1504, each capable of communicating with one another via a network 1503. Network 1503 may include, for example, a private network such as a local area network (LAN), a wide area network (WAN), a global area network (GAN) such as the Internet, or a combination of such networks, and may include a wired or wireless network.

E-reader devices 1502 and 1504 may be any type of device that can display text on a screen. For example, e-reader devices 1502 and 1504 may be a personal computer, a tablet computer, a mobile phone such as a smartphone, a personal digital assistant (PDA), a portable media player, a netbook or any other applicable device that is adapted for providing e-reader content. In the depicted embodiment, the client device (1502 or 1504) may include a browser and one or more applications, including a client e-reader component that interfaces with educational e-reader platform 1530 over network 1503. For example, the client device may be a tablet computer and the application is a mobile app that can access educational e-reader platform 1530 over network 1503. As another example, the client device may be a personal computer and a browser may be used to access educational e-reader platform 1530 over network 1503.

Educational e-reader platform 1530 may be implemented on one or more servers and may utilize software components on student e-reader devices 1502 and the teacher e-reader devices 1504. Some of the functionality described herein may be performed on client devices (e.g., student e-reader device or teacher e-reader device), the server devices, or any combination thereof. In one embodiment, educational e-reader platform 1530 may be part of a cloud computing system. Cloud computing, as used herein, refers to a collection of computing resources (hardware and software) that deliver services over a network. In some cases, an end-user on e-reader devices 1502 or 1504 may access cloud-based services or cloud-based resources over network 1503. Although embodiments described herein may be in the context of cloud computing, the embodiments may also be used in other configurations, such as client-server models, grid computing models, peer-to-peer, distributed computing models, or the like.

Educational e-reader platform 1530 may be implemented as software components executed on one or more processing devices and may be comprised of, for example, an insight collaboration tool, a report generator, a heat map tool, a trends and alerts tool, a conferencing tool, a customized library tool, a publisher API that interfaces with a publisher system 1550 over network 1503 or a separate private network, a library manager, a student assessment tool, and a recommendation tool. Educational e-reader platform 1530 may include more or less components than those illustrated in FIG. 15.

Educational e-reader platform 1530 may be further comprised of a central library data store 1517, which may be a file system, a database or other data management layers resident on a data storage device such as a disk drive, RAM, ROM, database, etc. The central library data store 1517 may store various types of data, including, for example, student records, class records, school records, digital content (e.g., purchased e-books available to the students), customized student libraries, reports, trends, or the like. The customized student libraries may be indexes to the digital content for the particular users. Alternatively, the customized libraries can be stored as part of the student records. The central library data store 1517 may also store indexes, as well as configurations for particular students, classes, schools, or the like.

Educational e-reader platform 1530 may be further comprised of an administrator console, which may provide data access to educational e-reader platform 1530, such as to create new records, set parameters, reconfigure parameters, or the like. The administrator console may be a web-based console that provides a user interface in a browser or as part of an application. For example, an administrator can access the console to view settings and configurations of educational e-reader platform 1530.

Educational e-reader platform 1530 may be further comprised of a user interface (UI) generator that generates the views described and illustrated with respect to FIGS. 1-14. In other embodiments, the UI generator may be used to generate other views to interact with students, teachers, principals, other educators or the like. Educational e-reader platform 1530 may include the customized library tool, library manager and student assessment tool as depicted. The customized library tool may be configured to provide a customized library to each of the students based on one or more inputs. The library manager may be configured to manage digital copies of the digital content on educational e-reader platform 1530. The student assessment tool may be configured to calculate reading scores and levels (or other metrics) of individual students. Embodiments of these components are described and illustrated with respect to FIGS. 16-18, respectively.

The insight collaboration tool of the educational e-reader platform may be configured to permit collaborations between students, between students and a teacher, and between students and an administrator. As described herein, the student may enter "thinking" comments in various views on the student e-reader device. The insight collaboration tool may facilitate the linking of comments of the students to the teacher's ThinkFeed, and vice versa. For example, when responding to a student's "thinking", the response may be published on one or more of the student's views, such as the ThinkFeed on the student's dashboard, or as notes on a "goals" view, or comments in a conference template. In one embodiment, the insight collaboration tool may create a database of the comments made by a student and responses by the teacher. These comments may also be stored as part of the student's records and the teacher's records. When a new comment or response is posted, the insight collaboration tool may be configured to automatically push the comment or response to the corresponding student or students. The insight collaboration tool may be configured to perform various operations, including those operations described earlier with respect to the collaborations described with respect to FIGS. 1-14.

The report generator of the educational e-reader platform may be configured to generate one or more reports based on the data in the central library. For example, the report generator may be configured to generate any of the graphs or plots illustrated in FIGS. 1-14. The reports may be textual or graphical. The report generator may extract certain types of data from the central library, such as Lexile measures of each of the students to generate a class progress report. The report generator may be used to generate reports for the students' views on the student e-reader device, for the teachers' views on the teacher's e-reader device, or for administrator views on an e-reader device, or on other types of devices, such as a web interface presented on a browser. The report generator may be configured to perform various operations, including those operations described earlier with respect to the reports described in FIGS. 1-14.

The heat map tool of the educational e-reader platform may be configured to generate one or more heat maps. These heat maps may be part of the reports generated by the educational e-reader platform. Alternatively, the heat maps may be generated as separate items for one or more of the views for the student, teacher, administrator, or any combination thereof. In one embodiment, the heat map tool may be integrated into the report generator. Alternatively, the report generator and the heat map tool may be separate components. The heat map tool may be configured to perform various operations, including those operations described earlier with respect to the heat maps described in FIGS. 1-14.

The trends and alerts tool of the educational e-reader platform may be configured to track data to determine trends in reading for individual students, for classes, for schools, or for districts. The trends and alerts tool may also generate alerts for students, classes, schools, or administrators. As described herein, a teacher may wish to push out an alert to her class based on observations about a trend that is manually detected by the teacher or automatically detected by the trends and alerts tool. The trends and alerts tool may push out the alert to the students' dashboards or other views on the student e-readers. Similarly, a principal could push out alerts to teachers. The trends and alerts tool may be configured to perform various operations, including those operations described earlier with respect to the alerts and trends described with respect to FIGS. 1-14.

The conferencing tool of the educational e-reader platform may be configured to facilitate conferences between one or more students and the teacher as described herein. The conferencing tool may allow the students or teachers to initiate a conference, schedule a conference and record notes from the conducted conferences. For example, a teacher may initiate a conference with a student and the conferencing tool may automatically populate a conference template with the student's information, the student's schedule, or the like. During the conference, the teacher may make notes regarding the conference that can be recorded in the conference template. Information in the conference template may also be pushed out to other views of the students by the conferencing tool. The conferencing tool may be configured to perform various operations, including those operations described earlier with respect to the conferencing in FIGS. 1-14.

Figure 16:
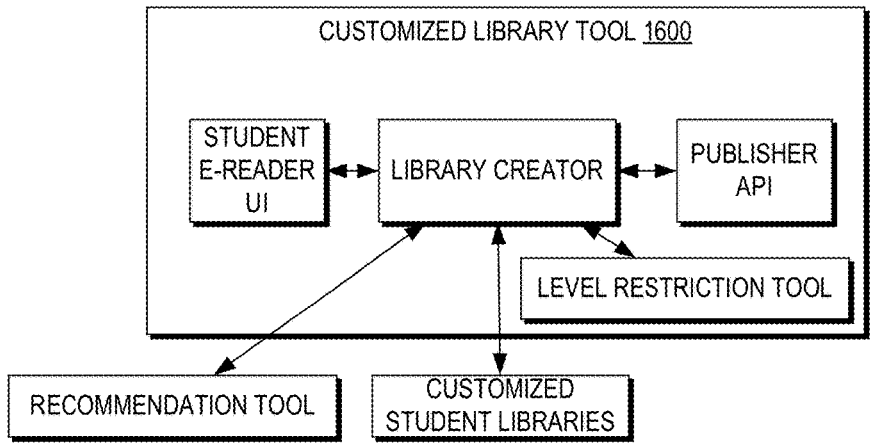
FIG. 16 is a block diagram of a customized library tool according to one embodiment.

FIG. 16 is a block diagram of a customized library tool 1600 according to one embodiment. The customized library tool may be comprised of a library creator, a student e-reader UI, and a publisher API. The library creator may be configured to create customized student libraries for the students. These customized student libraries may be displayed to an end-user via the student e-reader UI when requested and may be stored in the central library store or on local data stores of the student's e-reader device. The customized library for a student may include a book (or other digital content items) currently being read by the student or checked out to the student, a list of recommended books, or a list of all books available to the student. The library creator may employ an algorithm to process various inputs associated with a student to generate a customized library for each student. This can be statically on a periodic basis, dynamically (e.g., on-the-fly) when the library view is requested, or any combination thereof. Inputs to the library creator may include, but are certainly not limited to, a student's current reading level or other attributes that indicate which level of difficulty can be handled by the student, a list of available digital content items available in the central library, the levels and attributes of those items, as well as other attributes of the student, such as ratings by the student of other books read, specified interest in certain genre of books, trends in the student's reading patterns, or the like.

The customized library tool may be further comprised of a level restriction tool that is used to restrict books (or other items) that are outside of the student's reading level from the customized student library. In one embodiment, the library creator creates the customized student library and then the list of books may be analyzed by the level restriction tool to temporarily prevent the student from choosing certain books from the library. In another embodiment, the level restriction tool may provide the student's reading level as an input (hard constraint) on the library creator's algorithm for selecting items for the student's customized library. In yet another embodiment, the library creator receives input from a recommendation tool that specifically determines recommendations for the student as a sub-menu of the customized student libraries. These recommendations may be based on peer recommendations of classmates, similar books in a series of which the student has read one or more books from the series, or the like. In one embodiment, the recommendation tool may be integrated into the library creator itself.

As noted earlier, one of the inputs to the library creator can be the books (or other digital items) that are available for consumption. In one embodiment, the library creator may access the available items by a publisher via a publisher application programming interface (API). The API can be used to allow students to select books for purchasing, renting, checking out, or the like, without storing all available digital content on educational e-reader platform 1530. In other embodiments, the library creator may include an interface to the available digital content in the central library.

For example, a school may include a specific set of digital books available for distribution among the students of the school via the educational e-reader platform. In other embodiments, both digital content in the central library and digital content for purchase can be displayed in one or more views on the student's e-reader. It should be noted that copies of the digital content may be stored on the student's e-reader, on educational e-reader platform 1530, or on both. In other embodiments, a single copy may be stored in the cloud and accessed by the student over the network when reading. Alternatively, other techniques may be used for digital content management, such as to comply with copyrights, digital rights management (DRM) restrictions, or the like. The customized library tool may be configured to perform various operations, including those operations described earlier with respect to the student customized libraries described with respect to FIGS. 1-14.

Figure 17:
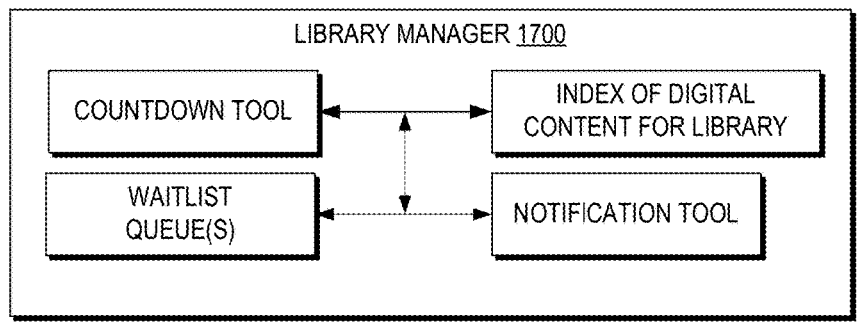
FIG. 17 is a block diagram of a library manager according to one embodiment.

One issue with digital content distribution is tracking the digital content of a digital library for an organization. For example, a school may purchase a limited number of copies of an electronic book. The purchased books may have copyright restrictions or digital rights management (DRM) restrictions on those copies. Educational e-reader platform 1530 may use the library manager to manage the digital content of the library. FIG. 17 is a block diagram of a library manager 1700 according to one embodiment. The library manager may be comprised of a countdown tool, one or more waitlist queues, an index with a number of available copies of the digital contents for the library, and a notification tool. The index may be used to track the number of available copies of the digital contents for the library. When a book is checked out, such as when selected by a student to read, the countdown tool may track the number of those copies that have already been checked out. Once the number of books checked out is equal to the number of available copies, the library manager may put the student on a waitlist queue for the particular book. The library manager may track when students check books back into the library and determine when the count for a particular book is now less than the number of available copies. When there is a copy available, the notification tool may notify the first student on the corresponding waitlist that the book is available for reading. Once checked out by the student, the student is removed from the waitlist and the countdown tool may update the count of available copies. The library manager may be configured to perform various operations, including those operations described earlier with respect to the student libraries, class library, or school library described with respect to FIGS. 1-14.

Figure 18:
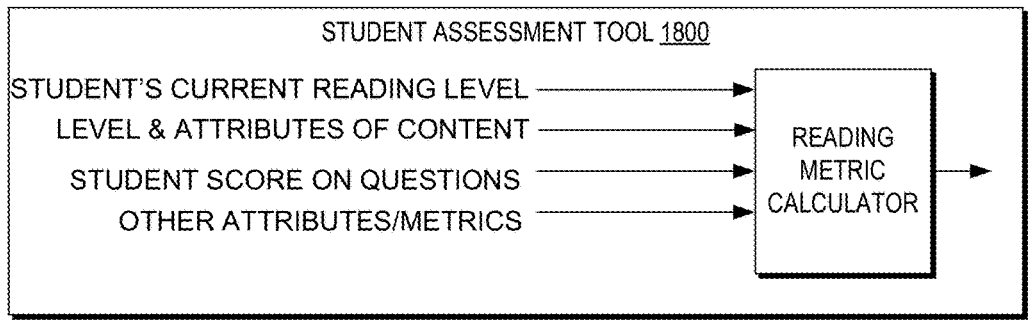
FIG. 18 is a block diagram of a student assessment tool according to one embodiment.

FIG. 18 is a block diagram of a student assessment tool 1800 according to one embodiment. The student assessment tool may be comprised of a reading metric calculator. The reading metric calculator may be an algorithm implemented as processing logic comprising hardware, software, firmware or any combination thereof. The reading metric calculator may receive one or more inputs, such as the student's current reading level, level of the digital content read by the student, attributes of the digital content read by the student, the student's score on tests, or other attributes and metrics from other sources. In one embodiment, the reading metric calculator computes a Lexile measure. In another embodiment, the reading metric calculator computes other reading metrics. The reading metrics calculated by the student assessment tool may be used by the customized library tool to generate a customized student library, to restrict access to digital content that is outside the student's reading abilities, or the like. The student assessment tool may also be used to restrict students from waitlists for digital content that is outside their range of reading ability. The reading metrics calculated may also be used for filtering recommendations by the recommendation tool, as well as other features of the educational e-reader platform. The student assessment tool may be configured to perform various operations, including those operations described earlier with respect to the student scores, Lexile measures, and other reading metrics described with respect to FIGS. 1-14.

Figure 19:
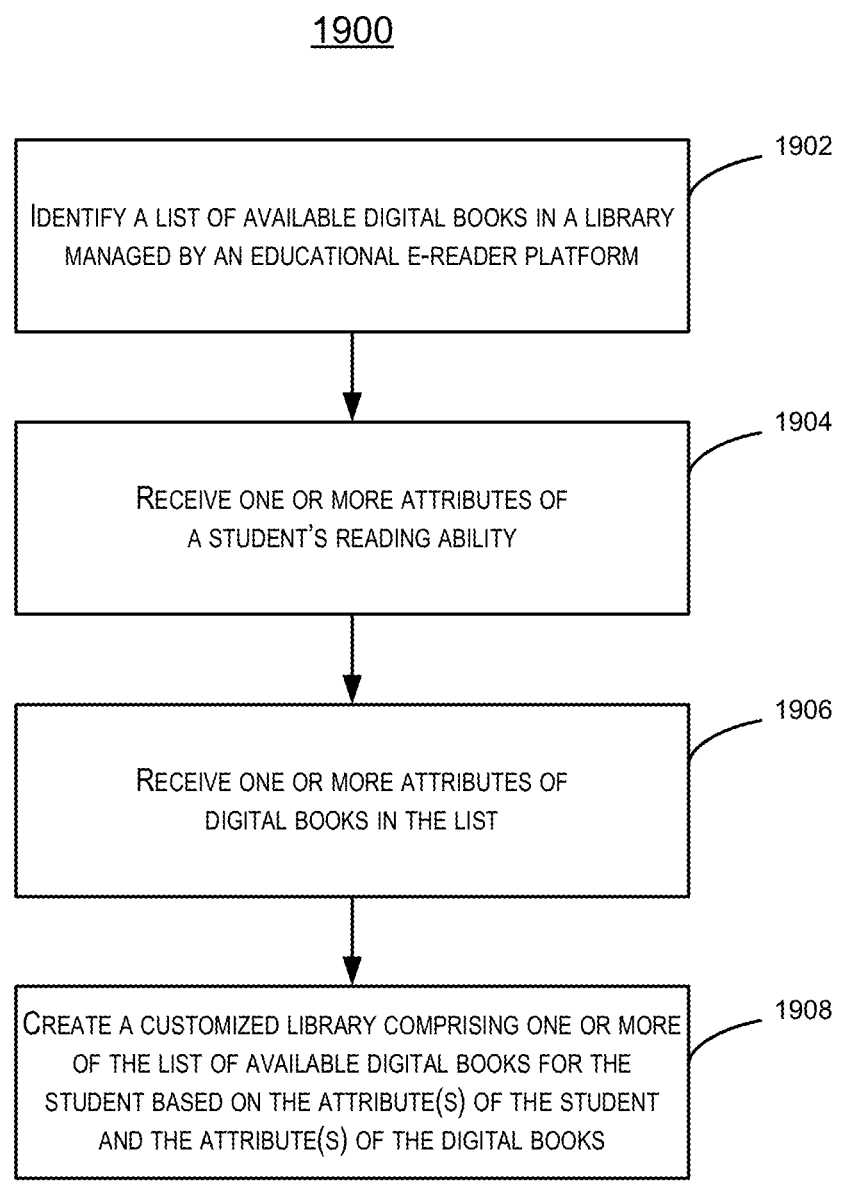
FIG. 19 is a flow diagram of a method of creating a customized student library according to one embodiment.

FIG. 19 is a flow diagram of one embodiment of a method 1900 of creating a customized student library according to one embodiment. Method 1900 may be performed by processing logic that may comprise hardware (circuitry, dedicated logic, etc.), software (such as is run on a general purpose computing system or a dedicated machine), firmware (embedded software), or any combination thereof. In one embodiment, the educational e-reader platform of FIG. 15 performs method 1900. In another embodiment, customized library tool 1600 of FIG. 16 may be configured to perform method 1900. Alternatively, other components of the student or teacher e-reader devices, servers of the cloud, or both may be configured to perform some or all of the operations of method 1900.

Referring to FIG. 19, processing logic may begin with identifying a list of available digital books in a library managed by an educational e-reader platform (block 1902). The processing logic may receive one or more attributes of a student comprising at least an indication of the student's reading ability (block 1904). The processing logic may also receive one or more attributes of the digital books in the list of available digital books in the library (block 1906). The processing logic may create a customized library comprising one or more of the list of available digital books for the student based on the one or more attributes of the student and the one or more attributes of the digital books in the list (block 1908).

Figure 20:
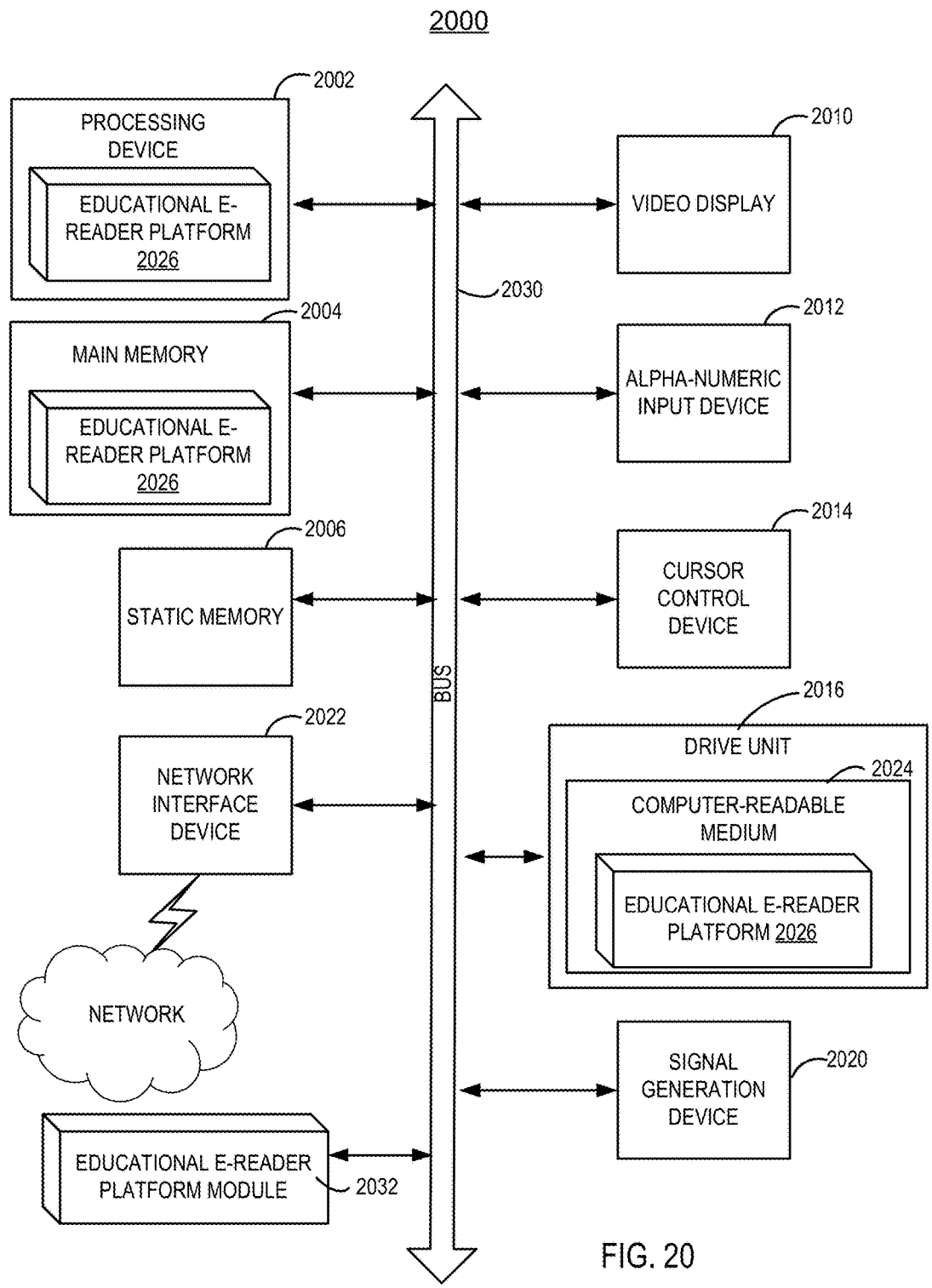
FIG. 20 illustrates a diagrammatic representation of a machine in the exemplary form of a computing system for an educational e-reader platform according to one embodiment.

FIG. 20 illustrates a diagrammatic representation of a machine in the exemplary form of a computing system for an educational e-reader platform according to one embodiment. Within the computing system 2000 may be a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for the educational e-reader platform, such as earlier-described method 1900. In one embodiment, computing system 2000 represents various components that may be implemented in educational e-reader platform 1530, such as on one or more servers of the cloud, as well as on the client computing systems, such as the student e-reader device or the teacher e-reader device as described herein.

Computing system 2000 may include a processing device 2002, a main memory 2004 (e.g., read-only memory (ROM), flash memory, dynamic random access memory (DRAM) such as synchronous DRAM (SDRAM), etc.), a static memory 2006 (e.g., flash memory, static random access memory (SRAM), etc.), and a data storage device 2016, each of which may communicate with each other via a bus 2030.

Processing device 2002 may represent one or more general-purpose processing devices such as a microprocessor, central processing unit, or the like. More particularly, processing device 2002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 2002 may also be one or more special-purpose processing devices such as an application specific integrated circuit (ASIC), a field programmable gate array (FPGA), a digital signal processor (DSP), network processor, or the like. Processing device 2002 may be configured to execute the processing logic (e.g., educational e-reader platform 2026) for performing the operations and steps discussed herein.

Computing system 2000 may further include a network interface device 2022. Computing system 2000 also may include a video display unit 2010 (e.g., a liquid crystal display (LCD) or a cathode ray tube (CRT)), an alphanumeric input device 2012 (e.g., a keyboard), a cursor control device 2014 (e.g., a mouse), and a signal generation device 2020 (e.g., a speaker).

Data storage device 2016 may include a computer-readable storage medium 2024 on which is stored one or more sets of instructions (e.g., educational e-reader platform 2026) embodying any one or more of the methodologies or functions described herein. Educational e-reader platform 2026 may also reside, completely or at least partially, within main memory 2004 and/or within processing device 2002 during execution thereof by computing system 2000, main memory 2004 and processing device 2002 also constituting computer-readable storage media. Educational e-reader platform 2026 may further be transmitted or received over a network via network interface device 2022.

While computer-readable storage medium 2024 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

Educational e-reader platform module 2032, components, and other features described herein can be implemented as discrete hardware components or integrated in the functionality of hardware components such as ASICS, FPGAs, DSPs, or similar devices. Educational e-reader platform module 2032 may implement operations of educational e-reader platform as described herein, for example, with respect to FIGS. 15-18. In addition, educational e-reader platform module 2032 may be implemented as firmware or functional circuitry within hardware devices. Further, educational e-reader platform module 2032 may be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A computer-implemented method comprising:
    identifying, by a processing device of an electronic book reader, a plurality of digital books available in a digital library, said plurality of digital books in said digital library accessible over a network connection;
    generating, by said processing device, a first set of attribute information related to a student, wherein said first set of attribute information comprising a measurement of interactions of said student with selected text content, wherein said measurement of interactions comprising matching one or more sentence completion results entered by said student at a display of the electronic book reader with the selected text content;
    determining, by said processing device, a lexile measure for said student based at least in part on said first set of attribute information and a progress determination in comparison of a reading standard defining a quantize reading level range for an age of said student;
    receiving, by said processing device, a second set of attribute information associated with said plurality of digital books available in said digital library;
    generating, by said processing device, a heat map on an interface of said electronic book reader based on said lexile measure, said heat map to indicate progress in said lexile measure of said student in comparison to an expected reading level threshold for said student by assigning different colors for said indicated progress;
    receiving, by said processing device via said interface, a selection of said heat map with respect to said student, said selection to activate on said display of the electronic book reader a consolidated view of said indicate progress over a period of time for a set of students comprising said student;
    creating, by said processing device, a customized digital library of digital books for selectable display on a student device associated with said student, said customized library created by filtering said plurality of digital books based on said second set of attribute information; and
    presenting, by said processing device, said customized digital library in a student dashboard associated with said interface on said electronic book reader, wherein said student dashboard is configured to enable communicative text interactions between said student and an educator.

2. The method of claim 1, wherein said attribute information of said student comprises a school grade level of said student.

3. The method of claim 1, wherein said attribute information of said student comprises the current reading level associated with said student.

4. The method of claim 1, wherein said attribute information of said student comprises a reading level associated with books read by said student.

5. The method of claim 1, wherein said attribute information of said student comprises ratings of books read and reviewed by said student.

6. The method of claim 1, wherein said attribute information of said student comprises information regarding an interest in a genre of books specified by said student.

7. The method of claim 1, wherein said attribute information of said student comprises a measured trend in a reading pattern associated with said student.

8. The method of claim 1, wherein creating said customized digital library comprises restricting access to one or more digital books available in said digital library.

9. The method of claim 1, wherein creating said digital library comprises providing recommendation information regarding one or more digital books available in said digital library.

10. The method of claim 1, wherein said student dashboard is configured to monitor reading statistics and progress data associated with said student.

11. The method of claim 10, wherein said reading progress is measured by using a Lexile scale associated with said lexile measure.

12. The method of claim 1, wherein said student dashboard is configured to monitor progress of said student in one or more common core educational standards.

13. The method of claim 1, further comprising presenting said one or more attributes of said student on an educator dashboard provided on the interface of said electronic book reader, wherein said educator dashboard is accessible to said educator or an administrator.

14. The method of claim 13, wherein said educator dashboard is configured to generate notifications relating to an activity associated with said student.

15. The method of claim 13, wherein said educator dashboard is configured to provide statistics regarding at least one of: said student, a class associated with said student, a grade level for said student and a school attended by said student.

16. A computer system, comprising:
    a memory to store digital books; and
    a processing device of an electronic book reader communicatively coupled to said memory, said processing device configured to:
    identify a plurality of digital books available in a digital library, said plurality of digital books in said digital library accessible over a network connection;
    generate a first set of attribute information related to a student, wherein said first set of attribute information comprising a measurement of interactions of said student with selected text content, wherein said measurement of interactions comprising matching one or more sentence completion results entered by said student at a display of the electronic book reader with the selected text content;
    determine a lexile measure for said student based at least in part on said first set of attribute information and a progress determination in comparison of a reading standard defining a quantize reading level range for an age said student;

receive a second set of attribute information associated with said plurality of digital books available in said digital library;

generate a heat map on an interface of said electronic book reader based on said lexile measure, said heat map to indicate progress in said lexile measure of said student in comparison to an expected reading level threshold for said student by assigning different colors for said indicated progress;

receive, via said interface, a selection of said heat map with respect to said student, said selection to activate on said display of the electronic book reader a consolidated view of said indicate progress over a period of time for a set of students comprising said student;

create a customized digital library of digital books for selectable display on a student device associated with said student, said customized library created by filtering said plurality of digital books based on said second set of attribute information;

present said customized digital library in a student dashboard associated with said interface on said electronic book reader, wherein said student dashboard is configured to enable communicative text interactions between said student and an educator.

17. A non-transitory computer-readable storage medium programmed to include instructions that, when executed by a processing device of an electronic book reader, cause said processing device to perform operations to:

identify, by said processing device, a plurality of digital books available in a digital library, said plurality of digital books in said digital library accessible over a network connection;

generate a first set of attribute information related to a student, wherein said first set of attribute information comprising a measurement of interactions of said student with selected text content, wherein said measurement of interactions comprising matching one or more sentence completion results entered by said student at a display of the electronic book reader with the selected text content;

determine a lexile measure for said student based at least in part on said first set of attribute information and a progress determination in comparison of a reading standard defining a quantize reading level range for an age said student;

receive a second set of attribute information associated with said plurality of digital books available in said digital library;

generate a heat map on an interface of said electronic book reader based on said lexile measure, said heat map to indicate progress in said lexile measure of said student in comparison to an expected reading level threshold for said student by assigning different colors for said indicated progress;

receive, via said interface, a selection of said heat map with respect to said student, said selection to activate on said display of the electronic book reader a consolidated view of said indicate progress over a period of time for a set of students comprising said student;

create a customized digital library of digital books for selectable display on a student device associated with said student, said customized library created by filtering said plurality of digital books based on said second set of attribute information;

present said customized digital library in a student dashboard associated with said interface on said electronic book reader, wherein said student dashboard is configured to enable communicative text interactions between said student and an educator.

18. The computer system of claim 16, wherein said processing device is further configured to present said one or more attributes of said student on an educator dashboard provided on the interface of said electronic book reader.

19. The non-transitory computer-readable storage medium of claim 17, wherein said processing device is further configured to present said one or more attributes of said student on an educator dashboard provided on the interface of said electronic book reader.

* * * * *